US012786198B2

(12) United States Patent
Dayani et al.

(10) Patent No.: US 12,786,198 B2
(45) Date of Patent: Nov. 3, 2026

(54) REDUCED PRIVILEGE ACCESS CONTROL ASSIGNMENT RECOMMENDATIONS FOR IDENTITIES IN MULTI-CLOUD ENVIRONMENTS

(71) Applicant: Microsoft Technology Licensing, LLC, Redmond, WA (US)

(72) Inventors: Chirag Dayani, Irvine, CA (US); Andrew Thomas Naber, Redmond, WA (US); Sateesh Pragallapati, Redmond, WA (US); Bo Zhang, Redmond, WA (US); Shaun Robert Applegate-Swanson, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/186,932

(22) Filed: Apr. 23, 2025

(65) Prior Publication Data

US 2026/0342799 A1 Oct. 29, 2026

(51) Int. Cl.
*H04L 9/40* (2022.01)

(52) U.S. Cl.
CPC .................................. *H04L 63/104* (2013.01)

(58) Field of Classification Search
CPC ..................................................... H04L 63/104
See application file for complete search history.

(56) References Cited

U.S. PATENT DOCUMENTS 9,401,904 B1 * 7/2016 Hankins .................. H04L 63/08
2014/0359692 A1 12/2014 Chari et al.
2019/0349391 A1 * 11/2019 Elsner .................. H04L 63/1425
2020/0065509 A1 * 2/2020 Ojha ........................ G06F 16/11
2021/0075795 A1 * 3/2021 Liu ........................ H04L 63/107
2021/0185050 A1 * 6/2021 Rosmann .............. H04L 63/102
2021/0243190 A1 * 8/2021 Bargury .............. G06F 16/9024
2021/0243208 A1 * 8/2021 Rubin ................... G06F 21/554
2021/0258321 A1 * 8/2021 Vegulla .................... G06N 5/04
(Continued)

FOREIGN PATENT DOCUMENTS

WO WO-2009120072 A1 * 10/2009 ............. H04L 51/00

OTHER PUBLICATIONS

Extended European Search Report Received for Application No. 26168521.8, Mailed on Aug. 28, 2026, 15 Pages.

*Primary Examiner* — Sarah Su
(74) *Attorney, Agent, or Firm* — Ray Quinney & Nebeker P.C.

(57) ABSTRACT

Recommendations of access control assignments are disclosed. Paired activity data is determined based on historical activity. The paired activity data including task and resource pairs that indicate a task performed by an individual identity, and a resource on which the task was performed. Over-privileging metrics are determined for candidate access control assignments based on the tasks and resource scopes granted by the candidate access control assignments and the paired activity data. Recommended access control assignments are determined as a subset of the candidate access control assignments with a lowest aggregate over-privileging metric whose combined permissions and resource scopes cover at least a predetermined percentage of the paired activity data. A responsive action is performed based on the recommended access control assignments.

20 Claims, 7 Drawing Sheets

(56) References Cited

U.S. PATENT DOCUMENTS

| | | | | |
|---|---|---|---|---|
| 2024/0039960 | A1* | 2/2024 | Applegate-Swanson | H04L 63/20 |
| 2024/0129324 | A1* | 4/2024 | Thimmareddy | H04L 63/102 |
| 2024/0348620 | A1* | 10/2024 | Parks | H04L 63/104 |
| 2025/0220552 | A1* | 7/2025 | Applegate-Swanson | H04L 63/102 |
| 2025/0300989 | A1* | 9/2025 | Jahagirdar | G06Q 40/0222 |

* cited by examiner

REDUCED PRIVILEGE ACCESS CONTROL ASSIGNMENT RECOMMENDATIONS FOR IDENTITIES IN MULTI-CLOUD ENVIRONMENTS

In multi-cloud environments, tenants control access to resources that are distributed across a plurality of cloud providers by assigning permissions to entities that control the tasks (e.g., read, write, delete, etc.) that the entities can perform and the resources on which those tasks can be performed. Entities can include individual entities that are associated with a human user and/or a machine (e.g., service, bot, etc.), and group entities that are associated with a group of entities, including individual entities and/or other group entities. Permissions are assigned to entities directly and/or indirectly by virtue of its membership in a group. For instance, individual entities and group entities inherit permissions assigned, directly or indirectly, to a group that it belongs to.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for determining recommended permissions for individual entities and group entities based on historical usage. Sets of recommended permissions are determined based on current permissions assigned to individual entities and/or group entities, and the historical usage of the assigned permissions by the entities.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
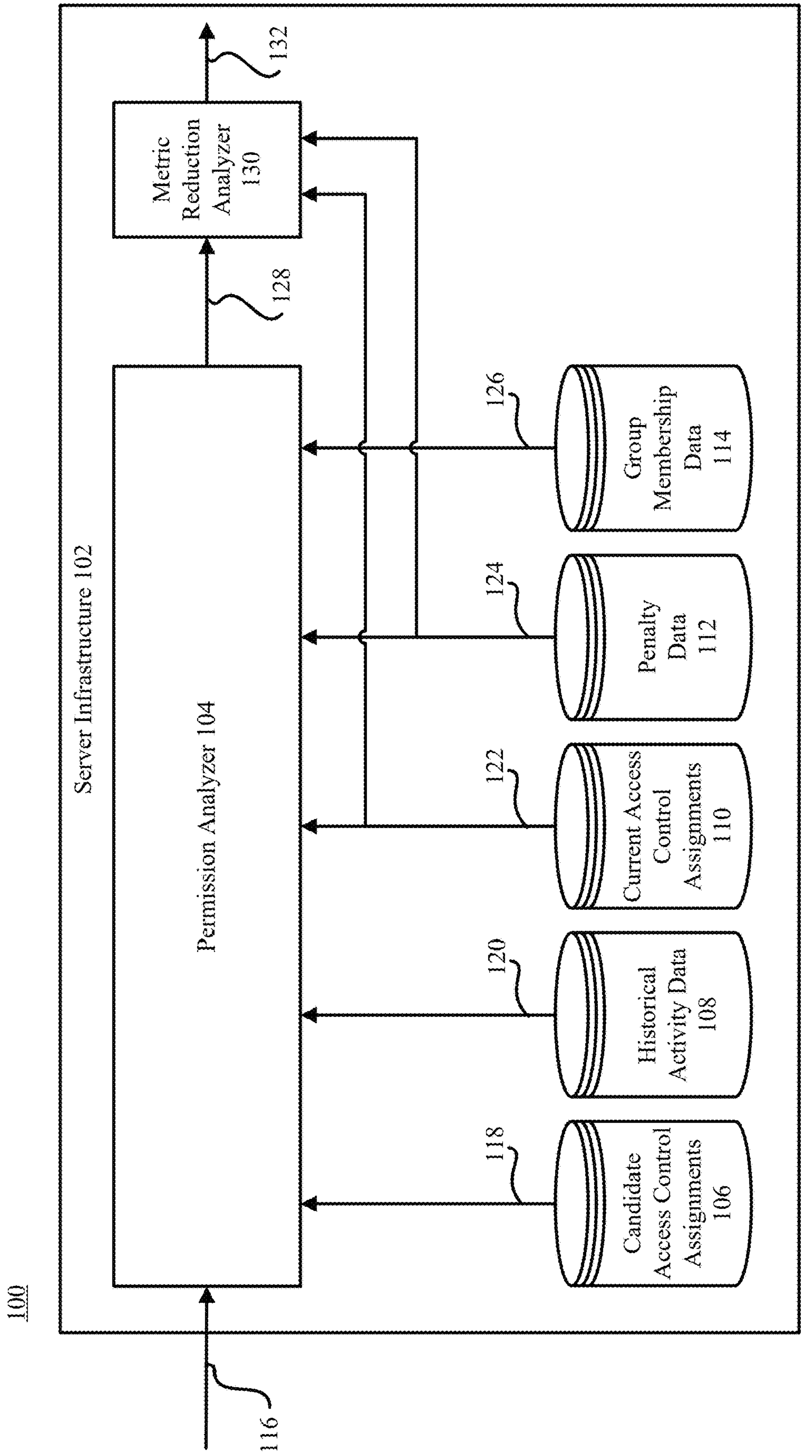
FIG. 1 shows a block diagram of an example system for determining reduced privilege access control assignment recommendations for individual and group identities, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Entities, whether human users or software programs, are frequently granted access to permissions beyond what are necessary for their intended tasks or responsibilities. In multi-cloud environments, tenants control access to resources that are distributed across a plurality of cloud providers by assigning permissions to entities that control the tasks that the entities can perform and the resources on which those tasks can be performed. Over-privileging, whether the result of improper access control management, disparate system complexity, the lack of proper processes, mergers and acquisitions, or other causes, may increase the vulnerability of a system to security threats. Proper access management and adhering to the principle of least privilege (PoLP) help mitigate the risks associated with over-privileging. Under PoLP, individual users and/or software programs are granted the minimum level of access or permissions necessary to perform their required tasks, thereby reducing the potential for unauthorized or excessive access and minimizing the risk of security breaches.

Determining an appropriate level of access for individual entities and/or group entities, however, can be complex and time-consuming due to balancing of tradeoffs. For instance, granting an entity less access may lower the risk of security breaches, but granting insufficient access may result in an unintended denial of access when the entity needs to perform a required task. On the other hand, granting an entity greater access will allow the entity to work in an unconstrained manner by allowing the entity to perform tasks without encountering a denial of access, but granting too much access may unnecessarily increase the risk of security breaches and/or damages resulting from a security breach. Determining an appropriate level of access for an entity in a multi-cloud environment may involve analyzing permissions and historical activity data in a plurality of cloud platforms. Furthermore, determining reduced permissions for a combination of individual entities and group entities needs to take into consideration whether the permission is granted to the individual entity directly or indirectly (e.g., via membership in a group), and the effect of changes to other members of the groups. The complexity associated with right-sizing access has led some customers (i.e., tenants) to permanently assign roles and/or policies with higher permissions than necessary for an entity to perform its tasks.

Embodiments described herein include an approach to reduced (fewer, including least) privilege permissions recommendations for individual and group entities in a multi-cloud environment by solving or approximately solving a weighted covering problem to determine a subset of the available permissions that results in a reduction in over-privileging while still allowing an entity to perform a percentage (e.g., 95%, 99%, 100%, etc.) of their historical activity. The weighted covering problem is solved or approximately solved using an approximation algorithm, such as a constant-factor approximation algorithm, a polynomial-time approximation scheme (PTAS) algorithm, a fully polynomial-time approximation scheme (FPTAS) algorithm, a quasi-polynomial-time approximation scheme (QPTAS) algorithm, and/or the like, or using a heuristic algorithm. Permissions not included in the set of recommended permissions are excluded from recommendation and/or assignment to the entity.

Various constraints can be added to the weighted covering problem to modify the permissions recommendation. For instance, constraints can be added to limit the number of candidate permissions that may recommended for an entity, adjust the amount of historical activity covered by the recommended permissions, and/or extend the recommendation to a 3-state recommendation. In a 3-state recommendation, the permissions are classified into one of three states: (1) except a permission from being assigned to the entity; (2) assign the permission to the entity on a permanent basis; or (3) assign the permission to the entity on an on-demand basis. Permissions assigned to an entity on a permanent basis allow the entity to perform permitted tasks at any time and/or frequency. Permissions assigned to an entity on an on-demand basis allow the entity to perform permitted tasks under one or more certain limitations. In instances, permissions assigned on a permanent basis are monitored at a low level of scrutiny. Following this 3-state approach, a resultant recommendation includes a set of permissions assignments that minimize a degree of over-privileging. These approaches can also be applied to a multi-cloud environment to provide reduced (e.g., least) privilege permissions recommendations for entities across as plurality of cloud platforms of a multi-cloud environment.

The weighted covering problem can additionally be modified to control the number of group entities and/or memberships in the group entities. In a first approach, current group memberships are ignored and new groups are formed based on a tuning parameter that controls the number of group entities that are recommended. In a second approach, the current group memberships are not changed by adding constraints to keep current group memberships static. In a third approach, access control assignment recommendations can modify current group membership to a certain extent by adding a group membership variable and penalty constraints to control the extent to which group permissions and/or group memberships deviate from current group permissions and/or group membership.

These and further embodiments are disclosed herein that enable the functionality described above and further such functionality. Such embodiments are described in further detail as follows.

For instance, FIG. 1 shows a block diagram of an example system 100 for determining reduced privilege access control assignment recommendations for individual and group identities, in accordance with an example embodiment. As shown in FIG. 1, system 100 includes server infrastructure 102 that includes a permission analyzer 104, candidate access control assignments 106, historical activity data 108, current access control assignments 110, penalty data 112, and group membership data 114. System 100 is described in further detail as follows.

Server infrastructure 102 comprises a network-accessible server set (e.g., cloud-based environment or platform). In an embodiment, the underlying resources of server infrastructure 102 are co-located (e.g., housed in one or more nearby buildings with associated components such as backup power supplies, redundant data communications, environmental controls, etc.) to form a datacenter, are distributed across different regions, and/or are arranged in other manners. Various example implementations of server infrastructure 102 are described below in reference to FIG. 8 (e.g., network-based server infrastructure 870, on-premises server 892, and/or components thereof).

An access control assignment designates an identity's (e.g., individual identity or group identity) ability to access resources within a computer system and perform tasks upon those resources. A n identity is a unique representation of an entity within a cloud or multi-cloud platform. A n identity is an identifier associated with a human user, a machine, and/or a group of users. An individual identity is a unique representation of a single individual entity. Individual entities include individual human users and/or individual machines. A group identity is a unique representation of a collection of entities. A group identity can represent collections of individual human users, collections of individual machines, and/or any combination thereof. For example, a group identity can comprise a representation for a type of user (e.g., an Administrator group identity, an Owner group identity, etc.), a department (e.g., an Accounting group identity, a Human Resources group identity, etc.), or a geographic entity (e.g., a London group identity, a Madrid group identity, etc.). A resource is a virtual or physical asset accessible by a computer system. Examples of a resource include a data asset (e.g., file, content, database), a computing asset (e.g., server, virtual machine), and a network asset (e.g., cloud service, cloud storage). A task is an operation that can be performed on a resource. Examples of a task include operations to edit, create, move, delete, modify, write, read, and/or use a resource. Access control assignments are used to control how an identity is able to access and then execute tasks on resources.

In embodiments, an access control assignment comprises permitted tasks and a resource scope. Permitted tasks can be determined based on an assignable attribute assignable to individual identity and/or group identity. The assignable attribute can include a role, a user group, and/or a policy. Permitted tasks indicate allowed operations that an identity can perform (e.g., edits, creates, moves, deletes, modifies, writes, reads, and/or uses of a resource an identity is allowed to perform) on resources. The resource scope then designates which resources an identity may perform the set of permitted tasks on. Access control assignments can vary across cloud platforms. In some cloud platforms, the set of permitted tasks is based on a role and/or user group associated with an identity and the resource scope identifies the resources on which the set of tasks may be performed. In other cloud platforms, a policy specifies the set of permitted tasks that may be performed by an identity and the resource scope designates the resources and/or resource groups that the set of tasks may be performed on.

In embodiments, access control assignments are used to determine a reduced privilege access control assignment recommendation for identities (e.g., one or more individual and/or or group identities). Permission analyzer 104 is configured to receive a set of identities 116 and determine a reduced privilege access control assignment recommendation 128 for the set of identities 116. In embodiments, permission analyzer 104 determines the reduced privilege access control assignment recommendation 128 based on candidate access control assignments 118 that are available to the set of identities 116. The set of identities 116 includes individual identities and/or group identities in the cloud platforms of a multi-cloud environment.

A candidate access control assignment is a permission available to a customer (e.g., cloud customer) for allocation to one or more identities associated with the customer. A candidate access control assignment can comprise candidate tasks and candidate resource scopes. A candidate task specifies a task allowed by the candidate access control assignment. A candidate task is an operation available for assignment to a customer identity to permit the customer identity to perform the operation. Examples of a candidate task include operations to edit, create, move, delete, modify, write, read, and/or use an asset. A candidate resource scope specifies the resources that the candidate access control assignment permits the candidate tasks to be performed on. The candidate resource scope is an asset available for assignment to a customer identity to enable the customer identity to perform the candidate task on the asset. For example, a candidate resource scope can include assets (e.g., files, databases, etc.) associated with (e.g., owned by, accessible to, etc.) a customer, services (e.g., cloud services, etc.) associated with (e.g., owned by, subscribed to, etc.) the customer, or cloud resources (e.g., virtual machines, etc.) associated with (e.g., owned by, subscribed to, etc.) the customer. A candidate access control assignment can include, but is not limited to, a provider-defined access control assignment and/or a customer-defined access control assignment that are available in one or more cloud platforms of the multi-cloud environment. For instance, cloud platforms can provide provider-defined access control assignments for particular roles (e.g., owner, administrator, etc.) that include a set of tasks permitted by the roles, and customers can define additional access control assignments to fit their particular needs.

A candidate access control assignment is assigned to an identity directly or indirectly. For instance, an access control assignment that is assigned to an individual identity directly grants the individual identity permission to perform tasks (e.g., permitted tasks) associated with the access control assignment on resources associated with the access control assignment (e.g., resource scope). In another instance, an access control assignment that is assigned to a group identity indirectly grants members of the group permission to perform tasks (e.g., permitted tasks) associated with the access control assignment on resources associated with the access control assignment (e.g., resource scope). Access control assignments are indirectly assigned to an identity by assigning the access control assignment to a group identity to which the identity belongs. For instance, an identity (e.g., individual identity and group identity) inherit access control assignments assigned, directly or indirectly, to a group that it belongs to.

In embodiments, permissions analyzer 104 determines reduced privilege access control assignment recommendation 128 based on historical activity data 120 associated with the set of identities 116. Permissions analyzer 104 determines paired activity data from the historical activity data 120. A paired activity datum is a set of two data items that includes a task performed by an identity or members of a group identity and a corresponding resource on which the task was performed. Permissions analyzer 104 can employ the paired activity data to determine over-privileging metrics for a set of candidate access control assignments.

In instances, permissions analyzer 104 determines a set of recommended access control assignments as a subset of candidate access control assignments 118 with the lowest aggregate over-privileging metrics whose combined candidate task set and combined candidate resource scope cover at least a predetermined percentage (e.g., 95%, 99%, 100%, etc.) of the historical activity of the identity. A set of recommended access control assignments is a subset of permissions available for assignment to an identity that results in the greatest reduction in over-privileging while still allowing an identity to perform a predetermined percentage of its historical activity. A n over-privileging metric is a measure of the number and/or types of tasks and/or resource scopes granted by an access control assignment that do not appear in the historical activity data of an identity.

Permissions analyzer 104 determines an over-privileging metric of candidate access control assignments 118 in various ways. For instance, permissions analyzer 104 determines an over-privileging metric for candidate access control assignments based on the historical use of the candidate tasks and candidate resource scopes granted by candidate access control assignments 118 by the set of identities 116, the type of permission granted (e.g., create, read, update, delete, etc.), the type of data (e.g., personally identifiable information (PII), medical data, financial information, large datasets, etc.) associated with the resource and/or resource groups, and/or the like. A n aggregate over-privileging metric for a subset of the candidate access control assignments is determined by combining the candidate tasks and/or the candidate resource scopes of the candidate access control assignments in the subset, and aggregating the penalties associated with the combined candidate task set and/or combined candidate resource scope that do not appear in the paired activity data. A combined candidate task set is the union of operations associated with a subset of permissions available for assignment to a customer identity. In embodiments, the combined candidate task set is determined as the union of the candidate tasks granted by candidate access control assignments in a subset of candidate access control assignments. A combined candidate resource scope is a union of assets associated with a subset of permissions available for assignment to a customer identity. In implementations the combined candidate resource scope is determined as the union of the candidate resource scopes granted by candidate access control assignments in a subset of candidate access control assignments. In configurations, the predetermined percentage is a parameter that is configurable by the customer. The subset of candidate access control assignments covers at least a percentage (e.g., 95%, 99%, 100%, etc.) of the historical activity and has the lowest aggregate over-privileging metric compared to other subsets of candidate access control assignments is determined as the set of recommended access control assignments.

In configurations, tasks and/or resources can be associated with a penalty whose value varies based on the characteristics (e.g., type of task, type of resource, size of resource, etc.), and the over-privileging metric of a candidate access control assignment is determined by aggregating (e.g., adding, averaging, etc.) the penalties for the tasks and resources granted by the candidate access control assignment that does not appear in the historical activity data. In embodiments, the penalty values are determined in various manners, such as, but not limited to, based on customer input, based on subject matter expert input, and/or the like. An aggregate over-privileging metric is a measure of the number and/or types of tasks and/or resource scopes granted by a subset of access control assignments that do not appear in the historical activity data of an identity.

In instances, a customer (e.g., tenant, cloud customer, etc.) can limit the scope of the reduced privilege access control assignment recommendation. For instance, a customer can limit the reduced privilege access control assignment recommendation to a particular identity or set of identities 116, including, but not limited to, one or more individual identities, one or more group identities, and/or any combination thereof. In configurations, customer-provided parameters and/or constraints provided to permission analyzer 104, include, but not limited to, maintaining the existing group structure, ignoring the existing group structure, limiting the amount and/or type of modifications allowed to the existing group structure, limiting the number of access control permissions that may be directly assigned to an identity, limiting the number of groups an identity (e.g., individual identity, group identity, etc.) may be member of, and/or the like. In configurations, permission analyzer 104 is configured to provide reduced privilege access control assignment recommendation 128 to metric reduction analyzer 130.

Permission analyzer 104 operates in various ways depending on parameters and/or constraints provided to permissions analyzer 104. In a first mode of operation, when current group memberships are ignored and new groups are formed, permission analyzer 104 determines sets of recommended access control assignments by solving or approximately solving the following weighted covering problem:

$$\begin{aligned}\text{minimize}\quad & \frac{1}{k}\sum_{i=1}^{k} c_i^T x_i\\ \text{subject to}\quad & Ax_i \geqslant b_i,\ i=1,\ \ldots\ ,k\\ & x_i \in \{0,1\}^p\end{aligned}, \qquad \text{(Eq. 1)}$$

where k is a positive integer representing the number of identities 116 under consideration, the vector $c_i \in R^p$ represents the penalty associated with each candidate permissions matrix where p is a positive integer representing the number of candidate permission matrices under consideration, $A \in R^{mn \times p}$ represents the aggregate candidate representation where each column or row is associated with a candidate access control assignment, where m is a positive integer representing the number of resources in an active-axis historical matrix and n is a positive integer representing the number of tasks in an active-axes historical matrix, the vector $b_i \in R^{mn}$ represents the flattened historic representation for identity i obtained by flattening a historic matrix into a resultant vector, and the Boolean vector $x_i$ represents the approximate weighted covering solution, where each entry in $x_i$ is associated with a candidate permissions matrix (a column or row of A). In the representation of the approximate weighted covering problem above in (Eq. 1), the approximate weighted covering solution $x_i$ covers 100% of the flattened historic representation $b_i$. In configurations, the weighted covering problem of (Eq. 1) is solved for each identity i using an approximation algorithm, such as, but not limited to, a constant-factor approximation algorithm, a polynomial-time approximation scheme (PTAS) algorithm, a fully polynomial-time approximation scheme (FPTAS) algorithm, a quasi-polynomial-time approximation scheme (QPTAS) algorithm, etc.).

In embodiments, permission analyzer 104 determines group permissions and/or group memberships by solving the following modified weighted covering problem:

$$\begin{aligned}\text{minimize}\quad & \frac{1}{k}\sum_{i=1}^{k} c_i^T x_i + \frac{2r}{k(k-1)}\sum_{i<j}[\![x_i - x_j]\!]_1\\ \text{subject to}\quad & Ax_i \geqslant b_i,\ i=1,\ \ldots\ ,k\\ & x_i \in \{0,1\}^p\end{aligned}, \qquad \text{(Eq. 2)}$$

where the tuning parameter r controls the number of group identities that will be recommended. When r=0, the weighted covering problem of (Eq. 2) reverts to the weighted covering problem of (Eq. 1) and any number of group identities may be recommended. A s $r \rightarrow \infty$, a single assignment (e.g., group identity) is recommended for all identities. Between these two extremes, a variable number of group identities will be recommended. Furthermore, an approximate hierarchy of group identities can be determined by solving or approximately solving the weighted covering problem of (Eq. 2) using various values for r. For instance, when a number of identities (e.g., individual identities, group identities, etc.) are covered under a single assignment (i.e., members of the same group identity) when $r=r_1$ and are covered under two different assignments (i.e., members of two different group identities) when $r=r_2<r_1$, a supergroup identity having the permissions common to the two different group identities can be recommended to encompass two different subgroup identities that each have the unique permissions of the two different group identities not assigned to the supergroup identity. A supergroup identity is a unique representation of a collection of entities having overlapping permissions.

In embodiments, permission analyzer 104 solves or approximately solves the weighted covering problem of (Eq. 2) using a heuristic algorithm. For instance, permission analyzer 104 determines, in embodiments, sets of recommended access control assignments on an individual basis for individual identities and individual members of group identities in the set of identities 116. For instance, permission analyzer 104 determines the sets of recommended access control assignments based on the tasks performed by the individual identities and the resources on which the tasks were performed. The resultant sets of recommended access control assignments for the individual identities represent reduced (e.g., least) privilege access control assignments for the individual identities. Once the sets of recommended access control assignments for the individual identities are determined, permission analyzer 104 clusters the individual identities into groups based on similarities (e.g., Euclidean distance, cosine similarity, etc.) between the sets of recommended access control assignments of the individual identities. For instance, permission analyzer 104 includes, within a cluster, identities that are less than a predetermined distance (e.g., Euclidean distance, cosine similarity, etc.) from a centroid of the cluster, where the centroid is calculated as the arithmetic mean of the members of the cluster. In embodiments, permission analyzer 104 clusters individual identities with similar recommended access control assignments into a group identity, where overlapping recommended access control assignments are assigned to the group identity instead of the individual identities and non-overlapping recommended access control assignments are assigned to the individual identities.

A hierarchy of group identities are determined by forming sub-groups. In instances, permission analyzer 104 forms sub-groups by clustering group identities into larger groups, where overlapping recommended access control assignments are assigned to a larger (i.e., parent) group identity and non-overlapping recommended access control assignments are assigned to the smaller (i.e., child) group identity. In this first mode of operation, permission analyzer 104 does not assign outlier individual identities with recommended access control assignments that are strikingly different than other individual identities to any group, and instead directly assigns the recommended access control assignments to the outlier individual identity. In embodiments, permission analyzer 104 performs clustering based on a hierarchical clustering algorithm, for example, but not limited to, DIvisive ANAlysis clustering (DIANA) algorithm, that builds a hierarchy of clusters using a top-down approach based on a similarity (e.g., Euclidean distance, cosine similarity, etc.) between the sets of recommended access control assignments of the individual identities. In configurations, permission analyzer 104 forms groups and/or subgroups without clustering by approximately solving the weighted covering problem of (Eq. 2) using a heuristic algorithm using various values for r.

In a second mode of operation, when current group memberships are not modified, permission analyzer 104 determines sets of recommended access control assignments by solving or approximately solving the following weighted covering problem:

$$\begin{aligned} \text{minimize} &= \frac{1}{k} tr(C^T X) \\ \text{subject to} &= AX \succcurlyeq B \\ & G \in \mathcal{G} \\ & X \preccurlyeq G^T Y \preccurlyeq pX \end{aligned}, \quad \text{(Eq. 3)}$$

where $X=[x_1 \ldots x_k]$, $B=[b_1 \ldots b_k]$, $C=[c_1 \ldots c_k]$, G represents a group matrix $G \in \{0, 1\}^{q \times p}$ where q is a positive integer representing the number of group identities in identities 116 and p is a positive integer representing the number of candidate permission matrices under consideration, $\mathcal{G} \subseteq \{0,1\}^{q \times p}$ represents the group membership constraints, and $Y \in \{0,1\}^{q \times k}$ represents a static group membership matrix for all identities. Additionally, in the group matrix G, $$G_{ij} = \begin{cases} 1 & \text{group } i \text{ has permission matrix } j \\ 0 & \text{otherwise} \end{cases}, \quad \text{(Eq. 4)}$$

where if group i is a subgroup of group j, then $g_i \succcurlyeq g_j$ (i.e., group i inherits all permissions of group j, and in the group membership matrix Y, $$Y_{ji} = \begin{cases} 1 & \text{identity } i \text{ is a member of group } j \\ 0 & \text{otherwise} \end{cases}. \quad \text{(Eq. 5)}$$

By keeping Y static, constraints are placed on the weighted covering problem of (Eq. 3) to keep current group memberships static (i.e., unchanged). Accordingly, permission analyzer 104 determines sets of recommended access control assignments for the group identities without changing the memberships of the group identities.

In embodiments, additional constraints can modify the operation of permission analyzer 104. For instance, permission analyzer 104 can recommend access control assignments for a subset of the group identities in the tenant, by adding equality constraints on the rows of G representing group identities that will remain unchanged. Additionally, permission analyzer 104 can also control which identity assignments (i.e., group memberships) can be modified using equality constraints. However, the use of such equality constraints may indirectly increase the over-privileging metrics of the remainder of the identities.

In embodiments, permission analyzer 104 solves or approximately solves the weighted covering problem of (Eq. 3) using a heuristic algorithm. For instance, permission analyzer 104 determines reduced (e.g., least) privilege access control assignment recommendations for the set of identities 116 by determining an existing hierarchical structure of the set of identities 116, and sequentially determining a set of recommended access control assignments for the set of identities 116 using a top-down approach. Identities are organized into a hierarchical (e.g., tree) structure by including, as root nodes, identities (e.g., individual identities, group identities, etc.) that are not a member of any other group. Each subsequent level of the hierarchical structure includes identities (e.g., individual identities, group identities, etc.) that are members of a node in the preceding level of the hierarchy. The hierarchical structure includes, as leaf nodes, identities (e.g., individual identities, group identities, etc.) that have no members. Permission analyzer 104 determines sets of recommended access control assignments for direct assignment to the identities in the root level of the hierarchy before proceeding to the next level in the hierarchy. This top-down approach ensures that higher-level groups retain only the minimum of necessary permissions, effectively shifting permissions to lower-level group identities and individual identities.

In a third mode of operation, when current group memberships can be modified to a certain extent, permission analyzer 104 determines sets of recommended access control assignments by solving or approximately solving the following weighted covering problem where Y is also a variable:

$$\begin{aligned} \text{minimize} \quad & \frac{1}{k} tr(C^T X) \\ \text{subject to} \quad & AX \succcurlyeq B \\ & G \in \mathcal{G} \\ & X_{li} \preccurlyeq \sum_{j=1}^{q} H_{lji} \preccurlyeq pX_{li} \\ \text{for} \quad & l = 1, \ldots, p \text{ and } i = 1, \ldots, k \end{aligned}, \quad \text{(Eq. 6)}$$

where $H_{lji}=G_{lj}Y_{ji}$, $H_{lji}\leq Y_{ji}$, and $H_{lji}\geq G_{lj}+Y_{ji}-1$. Additionally, penalty constraints are added to control the degree to which the recommended access control assignments deviate from current group permissions and/or current group memberships (e.g., $$\left|G_{li}-G_{ji}^{current}\right| \text{ and/or } \left|Y_{ji}-Y_{ji}^{current}\right|).$$

In configurations, a subset of group identities are kept static by adding equality constraints on the rows of G that are being kept static at their current values. Similarly, group memberships for a subset of group identities are kept static by adding equality constraints on the rows of Y that are being kept static at their current values.

In embodiments, "dummy" groups can be added to modify the operation of permission analyzer 104. In configurations, "dummy" groups are added to G and Y to allow for the creation of new group identities and/or the splitting of existing group identities. The number of "dummy" groups is a tunable parameter that controls the number of new group identities that may be created. Additionally, permission analyzer 104 can simultaneously recommend access control assignments for individual identities by employing single-identity "dummy" groups where an equality constraint is added to Y so that the only possible member of such a single-identity "dummy" group is the targeted identity: $Y_{ji}=0$for $i\neq j$.

In embodiments, permission analyzer 104 solves or approximately solves the weighted covering problem of (Eq. 6) using a heuristic algorithm. For instance, permission analyzer 104 determines reduced (e.g., least) privilege access control assignment recommendations for the individual and group identities by first determining sets of access control assignment recommendations for the identities using the second approach above, and then determining updated group memberships that reduce over-privileging metrics based on the updated access control assignment recommendations for the groups. For instance, permission analyzer 104 determines over-privileging metrics for a set of candidate group members (e.g., individual identities, group identities, etc.) for a target group based on the tasks and resource scopes granted by the recommended access control assignments for the target group and the paired activity data for the candidate members, and determines a set of recommended group members as a subset of candidate group members with a lowest aggregate over-privileging metric that covers at least a predetermined percentage of the paired activity data of the candidate members. Permission analyzer 104 proceeds by iteratively determining updated sets of access control assignment recommendations for the identities based on the updated group memberships, and determining updated group memberships for the groups that reduce over-privileging metrics based on the updated access control assignment recommendations. Iterations continue until a termination condition is satisfied, such as, but not limited to, after a predetermined number of iterations, after a predetermined period of time, and/or until there are no changes in the updated sets of access control assignment recommendations and/or updated group memberships.

In the third mode of operation, the creation of new groups is achieved by adding empty "dummy" groups at the start of the process, and, as the process iterates, identities are moved to the dummy groups to create the new groups and recommended access control assignments are determined for the new group. The number of new groups are be limited by the number of dummy groups that are added. Permission analyzer 104 will be described in greater detail in conjunction with FIG. 2 below.

In embodiments, the weighed covering problems of (Eqs. 1, 2, 3, and/or 6) is modified to generate an approximate weighted covering solution where the approximate weighted covering solution covers at least a percentage of the flattened historic representation $b_i$ that is less than 100% by replacing the constraint(s) $Ax_i \succcurlyeq b_i$ and/or $AX \succcurlyeq B$ in (Eqs. 1, 2, 3, and/or 6) with the following constraint:

$$\frac{1}{nnz(b_i)}\sum_{j=1}^{mn}\max\{(b_i)_j - a_j^T x_i,\ 0\} \leq t, \quad \text{(Eq. 7)}$$

where $nnz(b_i)$ represents the number of non-zero elements in the historical representation $b_i$, $a_j \in R^p$ represents the jth row of the flattened candidate permissions matrix A, $(b_i)_j \in R^p$ represents the jth entry of flattened historic representation $b_i$, and t represents the portion of the flattened historic representation $b_i$ that is not covered by the approximate weighted covering solution. The constraint in (Eq. 7) assesses a penalty of 1 for each instance where $(b_i)_j$ is 1, but is not covered by $x_i$ (i.e., when $$a_j^T x_i = 0).$$

In other words, each instance where $(b_i)_j$ is 1, but not covered by $x_i$ would incur the same penalty. However, in embodiments, the approximate weighted covering solution is determined based on other constraints that place a penalty that varies depending on other factors, such as, but not limited to, the type of task, the type of resource, the frequency of occurrence, and/or the like.

In configurations, penalties can be employed to modify the operation of permission analyzer 104. For instance, penalties can be added to the matrix G to promote group permission sparsity. For instance, a sum of 1-norm penalties on the rows of G (e.g., $$\sum_{i=1}^{q}\|g_i\|_1)$$

would attempt to force many of the groups to receive no permissions to enable the removal of groups with no permissions from consideration. If we are using "dummy" groups (e.g., for direct assignment permissions as described above), we could limit the previous sum to just those rows, i.e., penalize direct assignments.

In instances, permission analyzer 104 determines reduced privilege access control assignment recommendations that specify whether a recommended access control assignment should be assigned to an identity on a permanent basis or an on-demand basis. Permission analyzer 104 determines whether a recommended access control assignment should be assigned to an identity on a permanent basis or an on-demand basis by determining an approximate weighted covering solution (i.e., one-step solution) by considering candidate access control assignments based on both a permanent-basis over-privileging metric that is based on the occurrence of task and resource pairs in the historical representation, and an on-demand-basis over-privileging metric that is based on the frequency and/or pattern of occurrence of task and resource pairs in the historical representation. In embodiments, the permanent-basis over-privileging metrics and the on-demand-basis privileging metrics associated with the candidate access control assignments are represented by a new penalty matrix:

$$C=[c_1\ \ c_2]\in R^{p\times 2}, \quad \text{(Eq. 8)}$$

where the column $c_1 \in R^p$ represents the permanent-basis over-privileging metrics associated with selecting each candidate access control assignment on a permanent basis, and the column $c_2 \in R^p$ represents the on-demand-basis over-privileging metrics associated with selecting each candidate access control assignment on an on-demand basis. Based on this new penalty matrix, the decision variable $X_i \in \{0,1\}^p$ in the weighted covering problems of (Eqs. 1, 2, 3, and/or 6) becomes $X_1 \in \{0,1\}^{p\times 2}$. For instance, if a row of the p×2 matrix $X_i$, has a value of [0 0], the candidate access control assignment associated with the row is not selected as part of the approximate weighted covering solution. If a row of the p×2 matrix $X_i$ has a value of [1 0], the candidate access control assignment associated with the row has been selected as part of the approximate weighted covering solution on a permanent basis. If a row of the p×2 matrix $X_i$, has a value of [0 1], the candidate access control assignment associated with the row has been selected as part of the approximate weighted covering solution on an on-demand basis. Additionally, the constraint $X_i 1 \succcurlyeq 1$ is added to ensure that no row of the p×2 matrix $X_i$ can have a value of [1 1].

In configurations, constraints can be added to modify the operation of permission analyzer 104. For instance, permission analyzer 104 limits the number of access control assignments that may be directly assigned to an identity by adding the following constraint to the weighted covering problem of (Eqs. 1, 2, 3, and/or 6):

$$\sum_{j=1}^{p}(x_i)_j \le s_i, \quad \text{(Eq. 9)}$$

where $s_i$ is the limit on the number of access control assignments that may be directly assigned to an identity. In configurations, $s_i$ is a customer-configurable parameter that limits the number of access control assignments that may be assigned to an identity (e.g., group identity, individual identity, etc.) to a predetermined number of access control assignments.

Candidate access control assignments 106 is configured stores one or more candidate access control assignments that are available for assignment to one or more identities. In embodiments, candidate access control assignments 106 include candidate access control assignments that are available in one or more cloud platforms of a multi-cloud environment. For instance, in a first cloud platform, provider-defined access control assignments and customer-defined access control assignments include a role (e.g., provider-defined, customer-defined, etc.) and a resource scope, where the role specifies a set of role permissions to perform a set of tasks on resources in the resource scope, while in a second cloud platform, provider-defined access control assignments and customer-defined access control assignments include a policy (e.g., provider-defined, customer-defined, etc.) that includes a set of policy permissions to perform a set of tasks, and a set of policy resources on which the set of tasks may be performed. In configurations, access control assignments stored in candidate access control assignments 106 include a role and/or user group that specifies a set of tasks that may be performed by an identity that is assigned the role and/or user group, and a resource scope assignment that identifies the resources and/or resource groups that the tasks may be performed on. In instances, access control assignments stored in candidate access control assignments 106 include a policy that specifies a set of tasks that may be performed by an identity and the resources and/or resource groups that the tasks may be performed on.

In embodiments, candidate access control assignments 106 are assigned to an identity on a permanent basis or an on-demand basis. In instances, access control assignments assigned on a permanent basis allow an identity to perform the tasks permitted by the access control assignments on resources associated with the access control assignment at any time, while access control assignments granted on an on-demand basis allow the identity to perform the tasks permitted by the access control assignments on resources associated with the access control assignment in a more limited fashion. For instance, when assigned on-demand, the performance of the tasks permitted by the access control assignments on resources associated with the access control assignment may be limited by a time constraint (e.g., monthly, one day per quarter, weekdays only, etc.), a periodicity or seasonality limitation (e.g., one day per month/quarter/year, etc.), a frequency limitation (e.g., once a day/month/quarter, etc.), a data size (e.g., 1 million rows per day/month, etc.), a geographical constraint (e.g., while connected to a particular network, at the office, in the country, etc.), a supervision constraint (e.g., alert to an administrator and/or supervisor, logging the actions of the identity, prompting an administrator and/or supervisor for approval, etc.), and/or a historical usage constraint (e.g., tasks that satisfy a similarity threshold with historical activity). In embodiments, candidate access control assignments 118 that are available for the set of identities 116 are accessed from candidate access control assignments 106 based on a query that includes the set of identities 116.

Historical activity data 108 is configured to store historical activity data associated with one or more identities in one or more cloud platforms. In embodiments, historical activity data 108 stores tasks performed by an identity in conjunction with one or more of: the resource the task was performed on, the temporal information associated with when the task was performed, location information associated with where the identity performed the task from, the cloud platform in which the task was performed, and/or the like. For instance, historical activity data 108 includes, but is not limited to, tasks identifiers (e.g., create, read, update, delete, etc.) identifying tasks performed by the identity, the resource identifiers (e.g., filename, resource group identifier, etc.) identifying resources and/or resource groups that the tasks were performed on, and/or the cloud platform on which the task was performed on. In embodiments, historical activity data 108 is associated with temporal information (e.g., timestamp, frequency, rate, etc.) that is used to determine frequencies and/or patterns in the historical activity.

In embodiments, historical activity data 108 is analyzed to determine patterns in the usage of permissions currently assigned to the identity. For instance, temporal information associated with the historical activity is analyzed to determine a frequency (e.g., rate, etc.) periodicity (e.g., weekly, monthly, etc.) and/or seasonality (e.g., holidays, etc.) of tasks performed by the identity. Right-sized access control assignments assigned on an on-demand basis allow an identity to perform tasks that conform to its historical activity. For instance, an identity that performs the same task (e.g., report generation, payroll, etc.) on a periodic basis (e.g., monthly, quarterly, etc.) is assigned the right-sized access control assignments on an on-demand basis that allows the identity to continue to perform its periodic tasks. In embodiments, permissions analyzer 104 recommends access control assignments on an on-demand basis based on frequencies and/or patterns identified in historical activity of the identity. In configurations, historical activity data 120 associated with the set of identities 116 is retrieved from historical activity data 108 based on a query that includes the set of identities 116.

Current access control assignments 110 is configured to store one or more current access control assignments that are currently assigned to one or more identities in the cloud platform of a multi-cloud environment. A current access control assignment is a permission assigned to an identity at the time when permissions are analyzed to determine a reduced privilege recommendation. A current access control assignment specifies current tasks that are permitted by the current access control assignment and current resource scopes that the current access control assignment permits the current tasks to be performed on. A current task is an operation accessible to a customer identity at the time when permissions are analyzed to determine a reduced privilege recommendation. A current resource scope is a set of assets accessible to customer identity at the time when permissions are analyzed to determine a reduced privilege recommendation. In instances, current access control assignments 110 includes, but are not limited to, a role and/or user group that specifies a set of tasks that may be performed by an identity that is assigned the role and/or user group and a resource scope assignment that identifies the resources and/or resource groups that the tasks may be performed on, and/or a policy that specifies a set of tasks that may be performed by an identity and the resources and/or resource groups that the tasks may be performed on. In embodiments, current access control assignments 122 that are currently assigned to the set of identities 116 are accessed from current access control assignments 110 based on a query that includes the set of identities 116.

Penalty data 112 is configured to store penalty data associated with one or more of: permitted tasks and/or resource scopes associated with candidate access control assignments 118 stored in candidate access control assignments 106, permitted tasks and/or resource scopes associated with current access control assignments 122 stored in current access control assignments 110, and/or the like. In instances, penalty data 112 includes weighted values based on one or more factors associated with the permitted task and/or resource scope, such as, but not limited to: the type of permission granted (e.g., create, read, update, delete, etc.), the type of data (e.g., personally identifiable information (PII), medical data, financial information, large datasets, etc.) associated with the resource and/or resource groups, and/or the like. In embodiments, the weighted values are provided by a customer for determining reduced privilege access control assignment recommendations for the customer, or determined by one or more cloud platform providers based on relevant information, such as, but not limited to: information from subject matter experts, analysis of historical security breaches, analysis of detected intrusions, and/or the like. In embodiments, penalty data 124 associated with a customer is accessed from penalty data 112 for determining a set of recommended access control assignments for the set of identities 116.

Group membership data 114 includes membership information for group identities, including, but not limited to, group identity identifiers that uniquely identifies the groups, and/or member information that identifies members (e.g., individual identity, group identity, etc.) of the groups. In embodiments, group membership data 126 associated with the set of identities 116 is accessed from group membership data 114 based on a query that includes the set of identities 116.

Metric reduction analyzer 130 is configured to receive reduced privilege access control assignment recommendation 128 from permission analyzer 104, and determine a metric reduction based on current access control assignments 122 that are currently assigned to the set of identities 116, penalty data 124 associated with permitted tasks and/or resource scopes associated with reduced privilege access control assignment recommendation 128. In configurations, the current tasks are determined as the union of tasks granted by the current access control assignments assigned to an identity at the time when permissions are analyzed to determine and the set of access control assignment recommendations, and the current resource scopes are determined as the union of resource scopes granted by the current access control assignments assigned to an identity at the time when permissions are analyzed to determine and the set of access control assignment recommendations. In embodiments, metric reduction analyzer 130 determines current access control assignments 122 that are currently assigned to the set of identities 116 by accessing current access control assignments 110, and determines the current tasks and/or current resource scopes that are permitted by current access control assignments 122 that are currently assigned to the set of identities 116.

Metric reduction analyzer 130 is configured to determine an over-privileging metric for current access control assignments 122. In instances, metric reduction analyzer 130 determines an over-privileging metric for current access control assignments 122 that are currently assigned to the set of identities 116 by aggregating (e.g., adding, averaging, etc.) the penalties for the tasks and resources granted by current access control assignments 122 that does not appear in the historical activity data, and an over-privileging metric for reduced privilege access control assignment recommendation 128 by aggregating (e.g., adding, averaging, etc.) the penalties for the tasks and resources granted by reduced privilege access control assignment recommendation 128. Metric reduction analyzer 130 determines an over-privileging metric reduction based on the over-privileging metric for current access control assignments 122 and the over-privileging metric for reduced privilege access control assignment recommendation 128. For instance, metric reduction analyzer 130 determines the over-privileging metric reduction as a percentage by dividing the over-privileging metric for reduced privilege access control assignment recommendation 128 by the over-privileging metric for current access control assignments 122. In embodiments, metric reduction analyzer produces an output 132, such as, but not limited to, a recommendation provided to a customer, an instruction and/or command to implement the reduced privilege access control assignment recommendation, a GUI provided to a customer, and/or the like.

In embodiments, metric reduction analyzer 130 performs various responsive actions based on the reduced privilege access control assignment recommendation, including, but not limited to, automatically applying a portion or all of the set of recommended access control assignments to one or more identities (e.g., individual identities, group identities, etc.) by modifying the access control assignments assigned to the identities, automatically modifying group memberships for one or more group identities, providing a recommendation or prompt to the customer to apply the set of recommended access control assignments to one or more identities, providing a recommendation or prompt to the customer to modify group memberships for one or more group identities, and/or any combination thereof. In configurations, metric reduction analyzer 130 implements the reduced privilege access control assignment recommendation by providing one or more instructions, commands, and/or application programming interface (API) calls to one or more external systems (not depicted) as output 132.

In embodiments, metric reduction analyzer 130 applies the reduced privilege access control assignment recommendation to an identity in stages. For instance, in an initial stage, unused or infrequently used current access control assignments are transitioned from a permanent basis to an on-demand basis. After a period of time (e.g., 3 months, 1 year, etc.) has elapsed, in a second stage, the current access control assignments that were transitioned during the first stage are unassigned from the identity if they were not used by the identity during the elapsed period of time. In embodiments, metric reduction analyzer 130 generates a rollback checkpoint 232 when applying the reduced privilege access control assignment recommendation, and provides rollback checkpoint 232 for storage in rollback data 214.

In configurations, metric reduction analyzer 130 provides a customer the reduced privilege access control assignment recommendation along with an option for the customer to approve implementation of the reduced privilege access control assignment recommendation. For instance, metric reduction analyzer 130 provides the reduced privilege access control assignment recommendation to the customer via a communication (e.g., email, notification, alert, etc.) and/or via a user interface (e.g., GUI, etc.) that includes customer selectable elements (e.g., hyperlink, button, GUI element, etc.) to allow the customer to approve some or all of the reduced privilege access control assignment recommendation. In embodiments, metric reduction analyzer 130 provides the reduced privilege access control assignment recommendation to a customer device (not depicted) as output 132.

Figure 2:
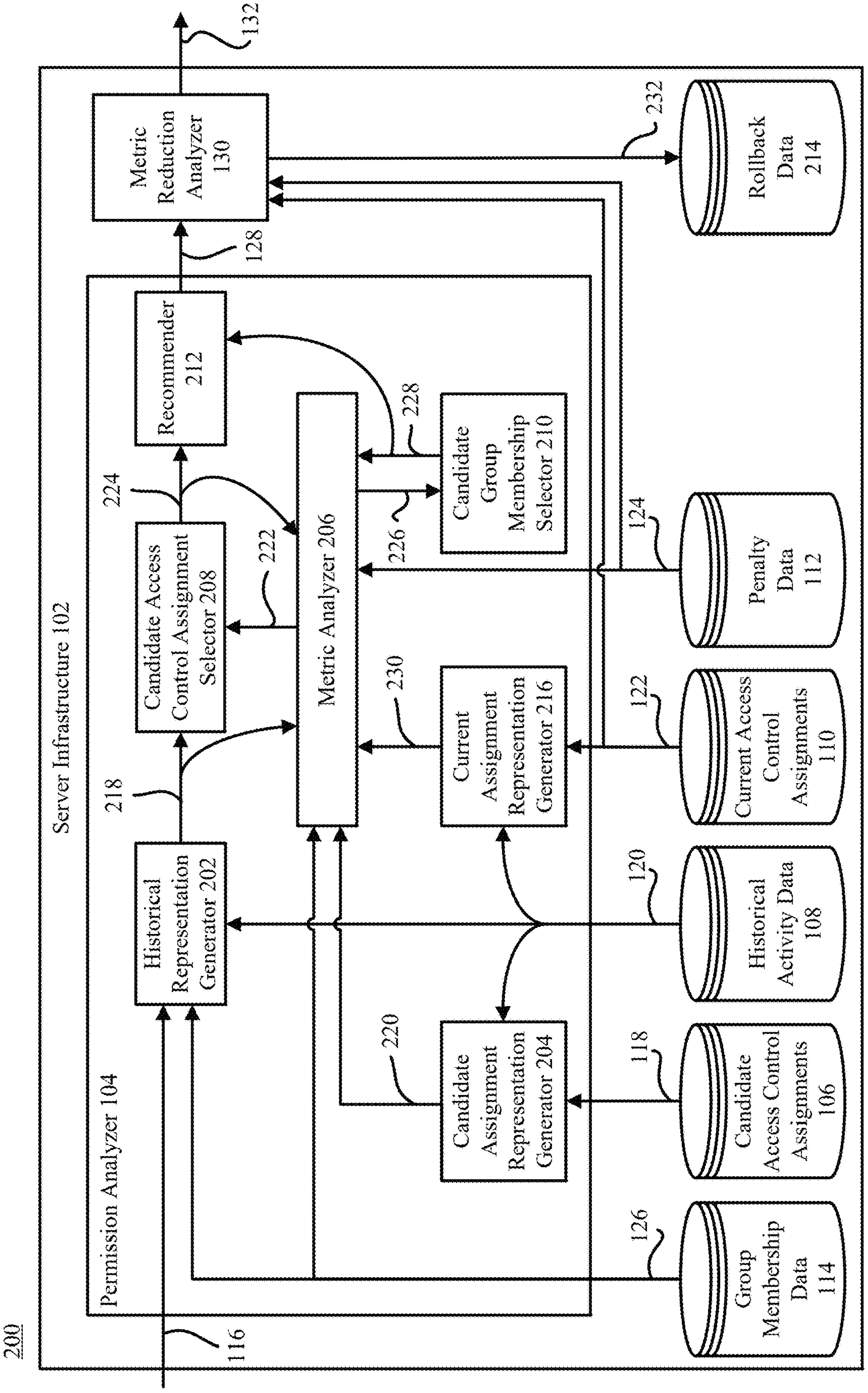
FIG. 2 shows a block diagram of an example system for determining reduced privilege access control assignment recommendations for individual and group identities based on an approximate weighted covering solution, in accordance with an embodiment.

Embodiments described herein may operate in various ways to determine reduced privilege access control assignment recommendations for individual and group identities based on an approximate weighted covering solution. For instance, FIG. 2 shows a block diagram of an example system 200 for determining reduced privilege access control assignment recommendations for individual and group identities based on an approximate weighted covering solution, in accordance with an embodiment. As shown in FIG. 2, system 200 includes server infrastructure 102, permission analyzer 104, candidate access control assignments 106, historical activity data 108, current access control assignments 110, penalty data 112, and group membership data 114, as shown in FIG. 1. In system 200, server infrastructure 102 further includes rollback data 214, and permission analyzer 104 further includes a historical representation generator 202, a candidate assignment representation generator 204, a metric analyzer 206, a candidate access control assignment selector 208, a candidate group membership selector 210, a recommender 212, and a current assignment representation generator 216. System 200 is described in further detail as follows.

Historical representation generator 202 is configured to receive the set of identities 116, to generate a historical representation 218 based on historical activity data 120 associated with the set of identities 116 that is retrieved from historical activity data 108 and group membership data 126 associated with the set of identities 116 that is retrieved from group membership data 114, and to provide historical representation 218 to metric analyzer 206 and candidate access control assignment selector 208. In embodiments, historical representation 218 includes, but is not limited to, a historic matrix and/or a flattened historic representation, as discussed above. For instance, an example of a historic matrix includes a two-dimensional active-axes historical matrix, where a first dimension represents the active tasks performed by the identity or set of identities and a second dimension represents the active resources on which the tasks were performed. An active-axes matrix isa two-dimensional matrix representation with a first dimension that indicates a task performed by an identity or set of identities in a predetermined time period and a second dimension that indicates a resource on which the task was performed in the predetermined time period.

Historical representation 218 is determined in various ways for individual identities and group identities. For an individual identity, historical representation 218 is determined based on the set difference between historical activity data 120 permitted by access control assignments directly assigned to the individual identity and historical activity data 120 permitted by access control assignments indirectly assigned to the individual identity. For a group identity, historical representation 218 is determined based on the set difference between historical activity data 120 associated with members of the group permitted by access control assignments directly assigned to the group identity and historical activity data 120 associated with members of the group permitted by access control assignments granted to the members of the group elsewhere. In embodiments, historical representation generator 202 determines historical activity data 120 associated with members of a group identity based on group membership data 126 associated with the set of identities 116.

The elements of historical representation 218 are determined in various ways to generate active-axes and full-axes matrices. The two-dimensional historical matrix, the elements represent task and resource pairs, and are populated with values (e.g., Boolean, numerical, etc.) to indicate whether a particular task and resource pair occurs in the historical activity data. For instance, a historical matrix $H \in \mathbb{R}^{m \times n}$, where the entries in the historical matrix are represented by:

$$H_{ij} = \begin{cases} 1 & \text{task } j \text{ was performed on resource } i \\ & \text{in the last } z \text{ periods} \\ 0 & \text{otherwise} \end{cases}, \quad \text{(Eq. 10)}$$

where m is a positive integer representing the number of resources in the active-axes historical matrix, n is a positive integer representing the number of tasks in the active-axes historical matrix, and z is any positive real (whole or fractional) number. In embodiments, the elements of the historical matrix are populated with numerical values to indicate the number of times a particular task and resource pair occurs in the historical activity data, a frequency at which the particular task and resource pair occurs in the historical activity data, a rate at which the particular task and resource pair occurs in the historical activity data, and/or a weighted value representing a risk associated with the particular task and resource pair. A flattened historic representation is determined by flattening the historical matrix into a resultant vector through various operations, such as, but not limited to, vectorization by stacking the columns or rows of the historic matrix on top of one another. In embodiments, historical representation 218 represent a subset of the historical activity associated with the set of identities 116 that is selected and/or filtered based on one or more criteria, such as, but not limited to, a type of task (e.g., create, read, update, delete, etc.), a type of resource (e.g., file type, data type, etc.), a time period (e.g., previous n days/months/quarters/Aprils/Summers/etc.), whether the activity is permitted in a latest record of permissions and/or resource scopes granted to the identity or set of identities, and/or the like.

Candidate assignment representation generator 204 is configured to generate a candidate access control assignment representation 220 based on candidate access control assignments 118 associated with the set of identities 116 that are retrieved from candidate access control assignments 106 and on historical activity data 120 associated with the set of identities 116 that is retrieved from historical activity data 108, and provide the generated candidate access control assignment representation 220 to candidate access control assignment selector 208. In embodiments, candidate access control assignment representation 220 includes, but is not limited to, one or more full-axes candidate access control assignments, one or more active-axes candidate access control assignments, an aggregate full-axes candidate representation generated based on one or more full-axes candidate access control assignments, and/or an aggregate active-axes candidate representation generated based on one or more active-axes candidate access control assignments. A full-axes matrix is a two-dimensional matrix representation with a first dimension that indicates all tasks in a cloud platform and/or a multi-cloud environment and a second dimension that indicates all resources associated with a customer of the cloud platform and/or the multi-cloud environment. In a two-dimensional full-axes candidate permissions matrix, a first dimension represents all possible tasks in the cloud platform and/or the multi-cloud environment and a second dimension represents the resources associated with a customer of the cloud platform and/or the multi-cloud environment. In a two-dimensional active-axes candidate permissions matrix, a first dimension represents the tasks that an identity or set of identities has acted upon in a predetermined time period and a second dimension represents the resources that the identity or the set of identities has acted upon in the predetermined time period.

The elements of candidate access control assignment representation 220 are determined in various ways to generate active-axes and full-axes matrices. In the full-axes candidate permissions matrix and/or active-axes candidate permissions matrix, each element represents a task and resource pair associated with the candidate access control assignment. The elements of the candidate permissions matrix (e.g., full-axes, or active-axes) are populated with Boolean values to indicate whether a particular task and resource pair is permitted by the candidate access control assignment. For instance, the full-axes candidate permissions matrix is represented by $P \in \mathbb{R}^{M \times N}$, where the entries in the full-axes candidate permissions matrix are represented by:

$$P_{ij} = \begin{cases} 1 & \text{task } j \text{ can be performed on resource } i \\ 0 & \text{otherwise} \end{cases}, \quad \text{(Eq. 11A)}$$

where M is a positive integer representing the number of resources in the full-axes candidate permissions matrix, N is a positive integer representing the number of tasks in the full-axes candidate permissions matrix. Similarly, the active-axes candidate permissions matrix is represented by $p \in \mathbb{R}^{m \times n}$, where the entries in the active-axes candidate permissions matrix are represented by:

$$p_{ij} = \begin{cases} 1 & \text{task } j \text{ can be performed on resource } i \\ 0 & \text{otherwise} \end{cases}, \quad \text{(Eq. 11B)}$$

where m is a positive integer representing the number of resources in the active-axes candidate permissions matrix, n is a positive integer representing the number of tasks in the active-axes candidate permissions matrix. When a candidate access control assignment does not permit a particular task on a particular resource or when the particular task is not possible on the particular resource, the element associated with particular task and particular resource pair in the candidate permissions matrix would have a Boolean value of FALSE or zero ("0"). In embodiments, the elements of the candidate permissions matrix (e.g., full-axes, or active-axes) are populated with weighted values based on one or more factors associated with the task and resource pair, such as, but not limited to: the type of permission granted (e.g., create, read, update, delete, etc.), the type of data (e.g., personally identifiable information (PII), medical data, financial information, large datasets, etc.) associated with the resource and/or resource groups, and/or the like.

Candidate access control assignment representations 220 are aggregated in various ways to generate aggregate candidate representations. An aggregate full-axes candidate representation is determined for a plurality of candidate access control assignments by horizontally or vertically concatenating resultant vectors obtained by flattening the full-axes candidate permissions matrices associated with the plurality of candidate access control assignments, and an aggregate active-axes candidate representation is determined for the plurality of candidate access control assignments by horizontally or vertically concatenating resultant vectors obtained by flattening the active-axes candidate permissions matrices associated with the plurality of candidate access control assignments. In embodiments, a full-axes candidate permissions matrix and/or an active-axes candidate permissions matrix are flattened into resultant vectors through various operations, such as, but not limited to, vectorization by stacking the columns or rows of a full-axes candidate permissions matrix and/or an active-axes candidate permissions matrix, respectively, on top of one another. After flattening a full-axes candidate permissions matrices and/or an active-axes candidate permissions matrices, the resultant vectors are horizontally or vertically concatenated to arrive at the aggregate full-axes candidate representation and the aggregate active-axes candidate representation, respectively.

Metric analyzer 206 is configured to receive historical representation 218 from historical representation generator 202 and candidate access control assignment representation 220 from candidate representation generator 204, and determine an over-privileging metric for each full-axes candidate access control assignment and/or active-axes access control assignment in candidate access control assignment representation 220 based on penalty data 124 obtained from penalty data 112. In instances, metric analyzer 206 determines over-privileging metric for candidate access control assignments using a penalty function based on various factors, such as, but not limited to: the tasks permitted by the candidate access control assignment, the resources and/or resource groups that the tasks may be performed on, whether the candidate access control assignment will be assigned on a permanent basis or an on-demand basis, the occurrence of task and resource pairs in a historical representation, a frequency of occurrence of task and resource pairs in a historical representation, and/or a pattern of occurrence of task and resource pairs in a historical representation. For instance, the over-privileging metric for a candidate access control assignment that will be assigned on a permanent basis is calculated as the number of permitted task and resource pairs associated with the candidate access control assignment that do not occur in historical activity of the identity, while the over-privileging metric for a candidate access control assignment that will be assigned on an on-demand basis is calculated as the number of permitted task and resource pairs associated with the candidate access control assignment and the frequency and/or pattern of occurrence of corresponding task and resource pairs in historical activity of the identity. In configurations, the over-privileging metric for permitted task and resource pairs is determined using an inverse relationship to the frequency of occurrence of the task and resource pair in historical activity of the identity. In embodiments, the determined over-privileging metrics are included in a penalty matrix. Metric analyzer 206 is further configured to provide, to candidate access control assignment selector 208, candidate access control assignment representation 220 and the determined over-privileging metrics as candidate access control assignment data 222.

Candidate access control assignment selector 208 is configured to select a set of recommended access control assignments 224 from a set of candidate access control assignments 118 for direct assignment to an identity of the set of identities 116. In embodiments, candidate access control assignment selector 208 receives historical representation 218 from historical representation generator 202, candidate access control assignment data 222 from metric analyzer 206, and determines a set of recommended access control assignments 224 as a subset of candidate access control assignments with a lowest aggregate over-privileging metric whose combined permissions and resource scopes cover at least a percentage (e.g., 95%, 99%, 100%, etc.) of the task and resource pairs in historical representation 218. In instances, candidate access control assignment selector 208 determines a set of recommended access control assignments 224 for direct assignment to an identity based on an approximate weighted covering solution that includes a subset of candidate access control assignments with a lowest aggregate over-privileging metric whose combined permissions and resource scopes cover at least a percentage (e.g., 95%, 99%, 100%, etc.) of the task and resource pairs in a historical representation.

Candidate access control assignment selector 208 operates in various ways depending on parameters and/or constraints provided to permissions analyzer 104. In a first mode of operation, when current group memberships are ignored and new groups are formed, candidate access control assignment selector 208 determines sets of recommended access control assignments by solving or approximately solving the weighted covering problem of (Eq. 2). For instance, candidate access control assignment selector 208 solves or approximately solves the weighted covering problem of (Eq. 2) using an approximation algorithm, such as, but not limited to, a constant-factor approximation algorithm, a PTAS algorithm, a FPTAS algorithm, a QPTAS algorithm, and/or the like. In embodiments, candidate access control assignment selector 208 determines an approximate hierarchy of group identities by solving the weighted covering problem of (Eq. 2) using various values for the tuning parameter r.

In embodiments, candidate access control assignment selector 208 solves or approximately solves the weighted covering problem of (Eq. 2) using a heuristic algorithm. For instance, candidate access control assignment selector 208 determines, in embodiments, sets of recommended access control assignments 224 on an individual basis for individual identities and individual members of group identities in the set of identities 116. For instance, permission analyzer 104 determines the sets of recommended access control assignments based on the tasks performed by the individual identities and the resources on which the tasks were performed. The resultant sets of recommended access control assignments 224 for the individual identities represent reduced (e.g., least) privilege access control assignments for the individual identities.

Once the sets of recommended access control assignments 224 for the individual identities are determined, candidate access control assignment selector 208 provides the recommended access control assignments 224 to recommender 212 and recommender 212 clusters the individual identities into groups based on similarities between the sets of recommended access control assignments 224 of the individual identities. For instance, recommender 212 clusters individual identities with similar recommended access control assignments into a group identity, where overlapping recommended access control assignments are assigned to the group identity instead of the individual identities and non-overlapping recommended access control assignments are assigned to the individual identities. In instances, recommender 212 forms sub-groups by clustering group identities into larger groups, where overlapping recommended access control assignments are assigned to a larger (i.e., parent) group identity and non-overlapping recommended access control assignments are assigned to the smaller (i.e., child) group identity. In this first mode of operation, recommender 212 does not assign outlier individual identities with recommended access control assignments that are strikingly different than other individual identities to any group, and instead directly assigns the recommended access control assignments to the outlier individual identity.

In a second mode of operation, when current group memberships are not modified, candidate access control assignment selector 208 determines sets of recommended access control assignments by solving or approximately solving the weighted covering problem of (Eq. 3). For instance, candidate access control assignment selector 208 solves or approximately solves the weighted covering problem of (Eq. 3) using an approximation algorithm, such as, but not limited to, a constant-factor approximation algorithm, a PTAS algorithm, a FPTAS algorithm, a QPTAS algorithm, and/or the like.

In embodiments, candidate access control assignment selector 208 solves or approximately solves the weighted covering problem of (Eq. 3) using a heuristic algorithm. For instance, candidate access control assignment selector 208 determines sets of recommended access control assignments 224 for the set of identities 116 by determining a hierarchy structure of the set of identities 116, and sequentially determining a set of recommended access control assignments for the set of identities 116 using a top-down approach. The hierarchical structure (e.g., tree) structure includes, as root nodes, identities (e.g., individual identities, group identities, etc.) that are not a member of any other group. Each subsequent level of the hierarchical structure includes identities (e.g., individual identities, group identities, etc.) that are members of a node in the preceding level of the hierarchy. The hierarchical structure includes, as leaf nodes, identities (e.g., individual identities, group identities, etc.) that have no members. Candidate access control assignment selector 208 determines sets of recommended access control assignments 224 for direct assignment to the identities in the root level of the hierarchy before proceeding to the next level in the hierarchy.

In a third mode of operation, when current group memberships can be modified to a certain extent, candidate access control assignment selector 208 determines sets of recommended access control assignments by solving or approximately solving the weighted covering problem of (Eq. 6). For instance, candidate access control assignment selector 208 solves or approximately solves the weighted covering problem of (Eq. 6) using an approximation algorithm, such as, but not limited to, a constant-factor approximation algorithm, a PTAS algorithm, a FPTAS algorithm, a QPTAS algorithm, and/or the like. In embodiments, candidate access control assignment selector 208 adds penalty constraints to the weighted covering problem of (Eq. 6) to control the degree to which the recommended access control assignments deviate from current group permissions and/or current group memberships (e.g., $$|G_{li} - G_{jl}^{current}| \text{ and/or } |Y_{ji} - Y_{ji}^{current}|).$$

In configurations, candidate access control assignment selector 208 adds "dummy" groups to G and Y to allow for the creation of new group identities and/or the splitting of existing group identities, where the number of "dummy" groups added controls the number of new group identities that may be created.

In embodiments, candidate access control assignment selector 208 solves or approximately solves the weighted covering problem of (Eq. 3) using a heuristic algorithm. For instance, candidate access control assignment selector 208 provides the determined sets of recommended access control assignments 224 to metric analyzer 206 to enable metric analyzer to calculate membership over-privileging metrics 226 for candidate group memberships based on the sets of recommended access control assignments 224. Candidate access control assignment selector 208 receives updated over-privileging metrics in updated candidate access control assignment data 222 from metric analyzer 206 that are determined by metric analyzer 206 based on updated group memberships 228 determined by candidate group membership selector 210, and iteratively updates the sets of recommended access control assignments 224 based on the updated over-privileging metrics. Iterations continue until a termination condition is satisfied, such as, but not limited to, after a predetermined number of iterations, after a predetermined period of time, and/or until there are no changes in the updated sets of access control assignment recommendations and/or updated group memberships. Upon satisfaction of an iteration termination condition, candidate access control assignment selector 208 provides determined sets of recommended access control assignments 224 to recommender 212. Modifications to the group memberships are performed by candidate group membership selector 210, and will be described in greater detail below.

In configurations, candidate access control assignment selector 208 determines the approximate weighted covering solution subject to one or more customer configurable constraints, such as, but not limited to, a minimum percentage of historical activity of the identity that needs to cover by the approximate weighted covering solution, the maximum number of candidate access control assignments that are selected for the approximate weighted covering solution, the maximum number of candidate access control assignments that are selected for the approximate weighted covering solution on a permanent basis, the maximum number of candidate access control assignments that are selected for the approximate weighted covering solution on an on-demand basis and/or the like. Candidate access control assignment selector 208 is configured to provide recommended access control assignments 224 to metric analyzer 206 and recommender 212. For instance, candidate access control assignment selector 208 solves or approximately solves the weighed covering problems of (Eqs. 2, 3, and/or 6) modified by replacing the constraint(s) $Ax_i \succcurlyeq b_i$ and/or $AX \succcurlyeq B$ in (Eqs. 2, 3, and/or 6) with the constraint in (Eq. 7) in order to determine an approximate weighted covering solution where the approximate weighted covering solution covers at least a percentage of the flattened historic representation $b_i$ that is less than 100%. In instances, candidate access control assignment selector 208 solves or approximately solves the weighed covering problems of (Eqs. 2, 3, and/or 6) modified by the constraint of (Eq. 9) in order to limit the number of access control assignments that may be directly assigned to an identity.

In configurations, candidate access control assignment selector 208 solves or approximately solves the weighed covering problems of (Eqs. 2, 3, and/or 6) modified by the penalty matrix of (Eq. 8) in order to simultaneously determine whether an access control assignment should be recommended on an on-demand basis or a permanent basis. In configurations, candidate access control assignment selector 208 determines whether a recommended access control assignment should be assigned to the set of identity 116 on a permanent basis or an on-demand basis using a two-step heuristic approach. Under a two-step heuristic approach, candidate access control assignment selector 208 determines the approximate weighted covering solution while considering candidate access control assignments on a permanent-basis based on a permanent-basis over-privileging metric. Subsequent to selecting a set of recommended access control assignments based on an approximate weighted covering solution, candidate access control assignment selector 208 recommends the set of recommended access control assignments on a permanent basis or an on-demand basis based on the frequency of occurrence (e.g., threshold number of occurrences, rate of occurrence, etc.) and/or pattern of occurrence (e.g., every month/quarter, etc.) of task and resource pairs in the historical representation.

Candidate group membership selector 210 is configured to receive membership over-privileging metrics 226 from metric analyzer 206, and determining updated group memberships 228 that reduce over-privileging metrics based on the updated access control assignment recommendations for the groups. For instance, candidate group membership selector 210 determines sets of recommended group members for group identities of the set of identities 116 as a subset of candidate group members with a lowest aggregate over-privileging metric that covers at least a predetermined percentage of the paired activity data of the candidate members. Candidate group membership selector 210 provides the updated group memberships 228 to metric analyzer 206 to enable metric analyzer 206 to determine updated over-privileging metrics for candidate access control assignments 118. Candidate group membership selector 210 iteratively receives updated membership over-privileging metrics 226 determined based on updated sets of recommended access control assignments 224, and determines updated group memberships 228 for the groups that reduce over-privileging metrics based on the updated access control assignment recommendations. In instances, candidate group membership selector 210 enables the creation of new groups by adding empty "dummy" groups at the start of the process, where the number of new groups are be limited by the number of dummy groups that are added. Iterations continue until a termination condition is satisfied, such as, but not limited to, after a predetermined number of iterations, after a predetermined period of time, and/or until there are no changes in the updated sets of access control assignment recommendations and/or updated group memberships. Upon satisfaction of an iteration termination condition, candidate group membership selector 210 provides the determined updated group memberships 228 to recommender 212.

Recommender 212 is configured to receive sets of recommended access control assignments 224 from candidate access control assignment selector 208, and/or determined updated group memberships 228 from candidate group membership selector 210, and determine a reduced privilege access control assignment recommendation 128 that indicates recommended assignment state for candidate access control assignments 118, and/or recommended group memberships for group identities in the set of identities 116. For instance, when the current group structure is ignored, recommender 212 determines new group memberships by clustering individual identities based on similarities between recommended access control assignments 224 for the individual identities. In instances, the recommended assignment states include at least one of: excepting the particular candidate access control assignment 106 from being assigned to one or more identities of the set of identities 116, assigning the particular candidate access control assignment to one or more identities of the set of identities 116 on a permanent basis, or assigning the particular candidate access control assignment to one or more identities of the set of identities 116 on an on-demand basis.

Current assignment representation generator 216 is configured to generate a current access control assignment representation 230 based on current access control assignments 122 currently assigned to the set of identities 116 that are retrieved from current access control assignments 110 and based on historical activity data 120 associated with the set of identities 116 that is retrieved from historical activity data 108. In embodiments, current access control assignment representation 230 includes, but is not limited to, one or more current permissions matrices associated with current access control assignments currently assigned to the set of identities 116, and/or an aggregate current representation generated based on one or more current permissions matrices associated with current access control assignments currently assigned to the set of identities 116. For an individual and group identities, current access control assignment representation 230 is determined based aggregate task and resource pairs of the access control assignments directly assigned to the individual or group identity.

A current permissions matrix includes a two-dimensional full-axes current permissions matrix, where a first dimension represents all possible tasks in the cloud platform and/or the multi-cloud environment and a second dimension represents the resources associated with a customer of the identity. The elements of the two-dimensional current permissions matrix represent task and resource pairs and are populated with Boolean values to indicate whether a particular task and resource pair is permitted by the current access control assignment. For instance, when the currently assigned access control assignments do not permit a particular task to be permitted on a particular resource, the element associated with particular task and particular resource pair in the current permissions matrix would have a Boolean value of FALSE or zero ("0"). An aggregate current representation is determined for the current access control assignments currently assigned to an identity by horizontally or vertically concatenating resultant vectors obtained by flattening the current permissions matrices associated with the current access control assignments into a resultant vector through various operations, such as, but not limited to, vectorization by stacking the columns or rows of the current permissions matrix on top of one another. After flattening the current permissions matrices, the resultant vectors are horizontally or vertically concatenated to arrive at the aggregate current representation. Current assignment representation generator 216 is configured to provide current access control assignment representation 230 to metric analyzer 206.

Figure 3:
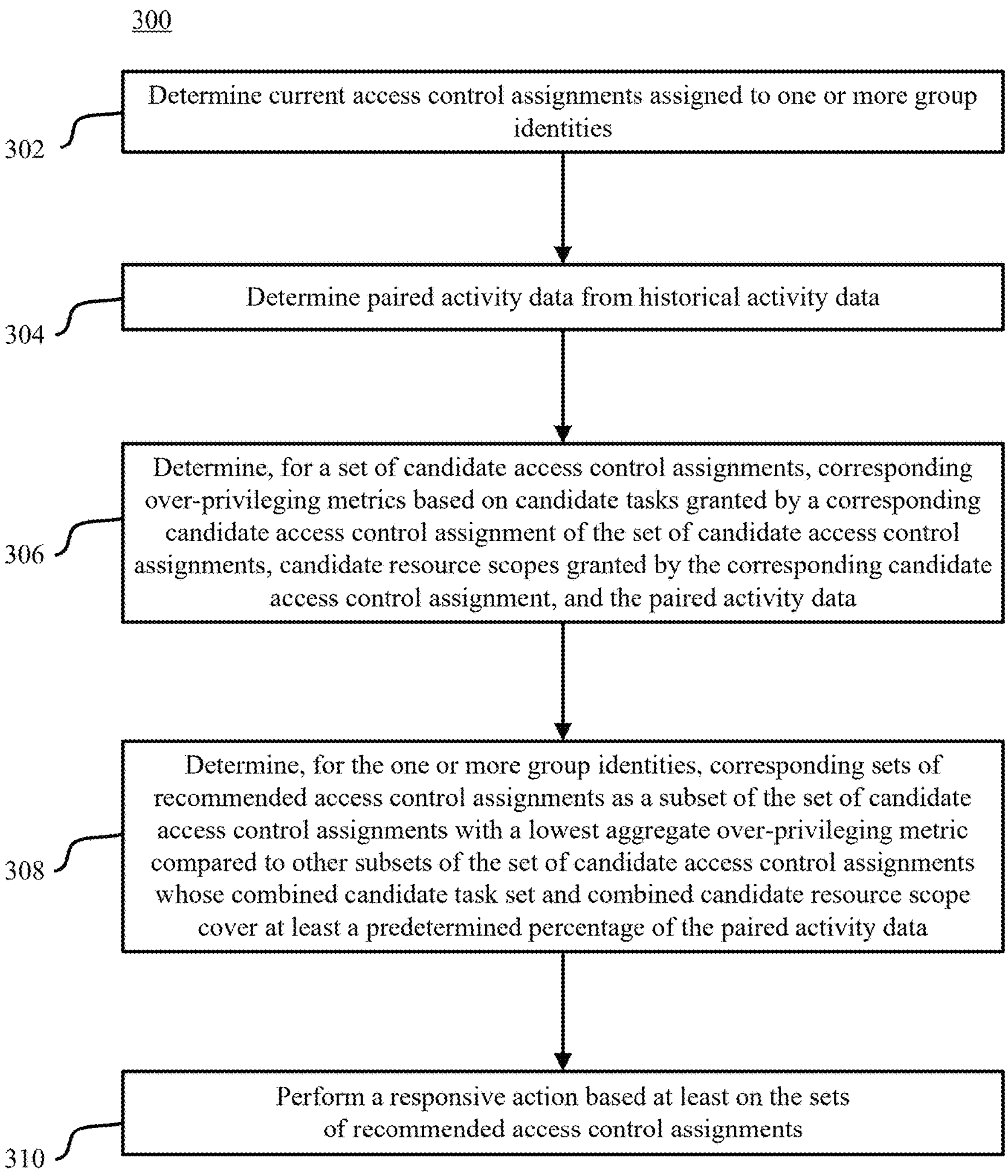
FIG. 3 depicts a flowchart of an example process for determining reduced privilege access control assignment recommendations for group identities, in accordance with an embodiment.

Embodiments described herein may operate in various ways to determine reduced privilege access control assignment recommendations for group identities. For instance, FIG. 3 depicts a flowchart 300 of a process for determining reduced privilege access control assignment recommendations for group identities, in accordance with an embodiment. Server infrastructure 102, permission analyzer 104, candidate access control assignments 106, historical activity data 108, current access control assignments 110, penalty data 112, group membership data 114, metric reduction analyzer 130, historical representation generator 202, candidate assignment representation generator 204, metric analyzer 206, candidate access control assignment selector 208, candidate group membership selector 210, and/or recommender 212 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, current access control assignments assigned to one or more group identities are determined. For instance, current assignment representation generator 216 of permission analyzer 104 determines current access control assignments 122 for the set of identities 116. In embodiments, current assignment representation generator 216 determines current access control assignments 122 that are currently assigned to identities 116 by accessing current access control assignments 110, and determines the current tasks (i.e., operations, etc.) that are permitted by the currently assigned access control assignments, and the current resource scopes (e.g., resources, resource groups, etc.) that the currently assigned access control assignments permit the current tasks to be performed on.

In step 304, paired activity data is determined from historical activity data. For instance, historical representation generator 202 determines historical activity data 120 for the set of identities 106, and generates historical representation 218. For an individual identity, historical representation 218 is determined based on the set difference between historical activity data 120 permitted by access control assignments directly assigned to the individual identity and historical activity data 120 permitted by access control assignments indirectly assigned to the individual identity. For a group identity, historical representation 218 is determined based on the set difference between historical activity data 120 associated with members of the group permitted by access control assignments directly assigned to the group identity and historical activity data 120 associated with members of the group permitted by access control assignments granted to the members of the group elsewhere. In embodiments, historical representation generator determines historical activity data 120 associated with members of a group identity based on group membership data 126 associated with the set of identities 116.

In step 306, over-privileging metrics corresponding to a set of candidate access control assignments are determined based on candidate tasks granted by a corresponding candidate access control assignment of the set of candidate access control assignments, candidate resource scopes granted by the corresponding candidate access control assignment, and the paired activity data. For instance, metric analyzer 206 determines over-privileging metrics for candidate access control assignments 118, and provides the determined over-privileging metrics to candidate access control assignment selector 208 as part of as candidate access control assignment data 222. In instances, metric analyzer 206 determines over-privileging metric for candidate access control assignments using a penalty function based on various factors, such as, but not limited to: the tasks permitted by the candidate access control assignment, the resources and/or resource groups that the tasks may be performed on, whether the candidate access control assignment will be assigned on a permanent basis or an on-demand basis, the occurrence of task and resource pairs in a historical representation, a frequency of occurrence of task and resource pairs in a historical representation, and/or a pattern of occurrence of task and resource pairs in a historical representation. For instance, the over-privileging metric for a candidate access control assignment that will be assigned on a permanent basis is calculated as the number of permitted task and resource pairs associated with the candidate access control assignment that do not occur in historical activity of the identity, while the over-privileging metric for a candidate access control assignment that will be assigned on an on-demand basis is calculated as the number of permitted task and resource pairs associated with the candidate access control assignment and the frequency and/or pattern of occurrence of corresponding task and resource pairs in historical activity of the identity.

In step 308, sets of recommended access control assignments corresponding to the one or more group identities are determined as a subset of the set of candidate access control assignments with a lowest aggregate over-privileging metric compared to other subsets of the set of candidate access control assignments whose combined candidate task set and combined candidate resource scope cover at least a predetermined percentage of the paired activity data. For instance, candidate access control assignment selector 208 selects a set of recommended access control assignments 224 from a set of candidate access control assignments 118 for direct assignment to an identity of the set of identities 116. In embodiments, candidate access control assignment selector 208 receives historical representation 218 from historical representation generator 202, candidate access control assignment data 222 from metric analyzer 206, and determines a set of recommended access control assignments 224 as a subset of candidate access control assignments with a lowest aggregate over-privileging metric whose combined permissions and resource scopes cover at least a percentage (e.g., 95%, 99%, 100%, etc.) of the task and resource pairs in historical representation 218.

When current group memberships are ignored and new groups are formed, candidate access control assignment selector 208 determines, in embodiments, sets of recommended access control assignments 224 on an individual basis for individual identities and individual members of group identities in the set of identities 116. For instance, permission analyzer 104 determines the sets of recommended access control assignments based on the tasks performed by the individual identities and the resources on which the tasks were performed. The resultant sets of recommended access control assignments 224 for the individual identities represent reduced (e.g., least) privilege access control assignments for the individual identities. Once the sets of recommended access control assignments 224 for the individual identities are determined, candidate access control assignment selector 208 provides the recommended access control assignments 224 to recommender 212 and recommender 212 clusters the individual identities into groups based on similarities (e.g., cosine similarity, etc.) between the sets of recommended access control assignments 224 of the individual identities. When modifications to the current group memberships are restricted (e.g., limited, not permitted), candidate access control assignment selector 208 determines sets of recommended access control assignments 224 for the set of identities 116 by organizing the set of identities 116 in to a hierarchical structure, and sequentially determining a set of recommended access control assignments for the set of identities 116 using a top-down approach.

In step 310, a responsive action is performed based at least on the sets of recommended access control assignments. For instance, metric reduction analyzer 130 performs various responsive actions based on the reduced privilege access control assignment recommendation, including, but not limited to, automatically applying a portion or all of the set of recommended access control assignments to one or more identities (e.g., individual identities, group identities, etc.) by modifying the access control assignments assigned to the identities, automatically modifying group memberships for one or more group identities, providing a recommendation or prompt to the customer to apply the set of recommended access control assignments to one or more identities, providing a recommendation or prompt to the customer to modify group memberships for one or more group identities, and/or any combination thereof. In configurations, metric reduction analyzer 130 implements the reduced privilege access control assignment recommendation by providing one or more instructions, commands, and/or application programming interface (API) calls to one or more external systems (not depicted) as output 132.

In embodiments, metric reduction analyzer 130 applies the reduced privilege access control assignment recommendation to an identity in stages. For instance, in an initial stage, unused or infrequently used current access control assignments are transitioned from a permanent basis to an on-demand basis. After a period of time (e.g., 3 months, 1 year, etc.) has elapsed, in a second stage, the current access control assignments that were transitioned during the first stage are unassigned from the identity if they were not used by the identity during the elapsed period of time. In embodiments, metric reduction analyzer 130 generates a rollback checkpoint 232 when applying the reduced privilege access control assignment recommendation, and provides rollback checkpoint 232 for storage in rollback data 214.

Figure 4:
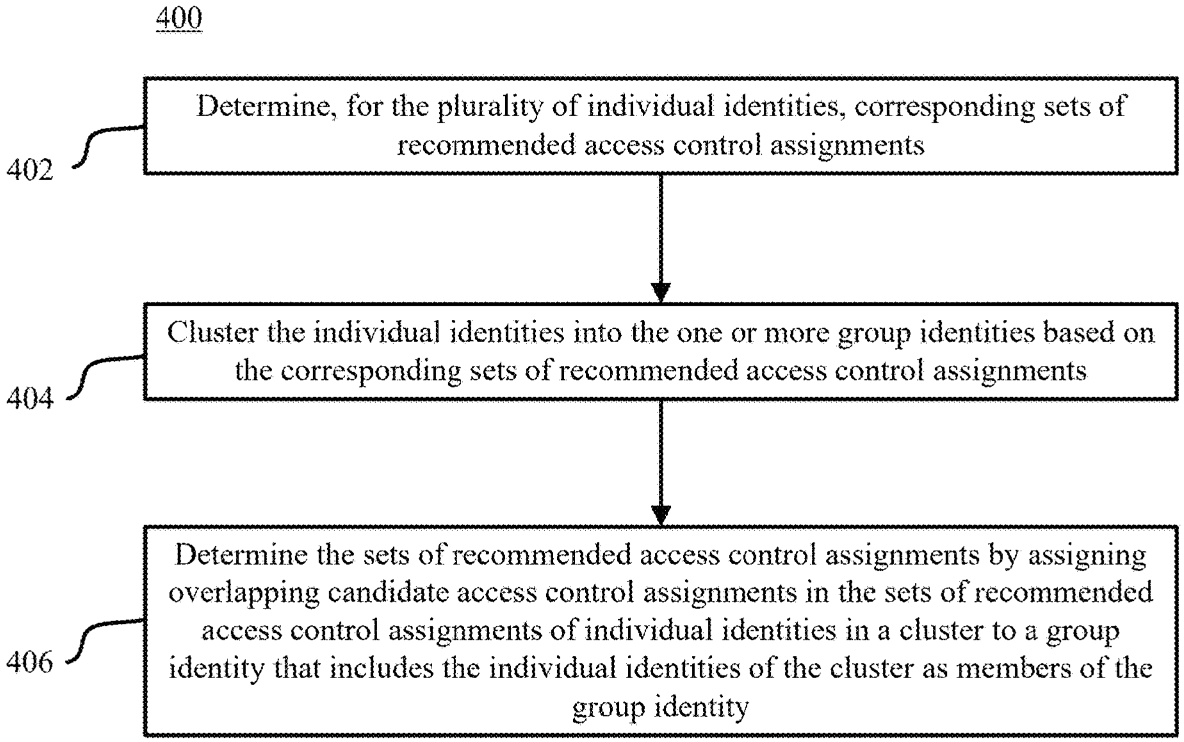
FIG. 4 depicts a flowchart of an example process for determining reduced privilege access control assignment recommendations for individual and group identities by clustering individual identities, in accordance with an embodiment.

Embodiments described herein may operate in various ways to determine reduced privilege access control assignment recommendations for individual and group identities by clustering individual identities. For instance, FIG. 4 depicts a flowchart 400 of a process for determining reduced privilege access control assignment recommendations for individual and group identities by clustering individual identities, in accordance with an embodiment. Server infrastructure 102, permission analyzer 104, candidate access control assignments 106, historical activity data 108, current access control assignments 110, penalty data 112, group membership data 114, historical representation generator 202, candidate assignment representation generator 204, metric analyzer 206, candidate access control assignment selector 208, candidate group membership selector 210, and/or recommender 212 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1 and 2 for illustrative purposes.

Flowchart 400 starts at step 402. In step 402, corresponding sets of recommended access control assignments are determined for a plurality of individual identities. For instance, candidate access control assignment selector 208 determines sets of recommended access control assignments 224 for the identities 116 and/or members thereof as a subset of candidate access control assignments with a lowest aggregate over-privileging metric whose combined permissions and resource scopes cover at least a predetermined percentage of the task and resource pairs in historical representation 218. In embodiments, candidate access control assignment selector 208 determines sets of recommended access control assignments on an individual basis for individual identities and individual members of group identities in the set of identities 116 based on the tasks performed by the individual identities or individual members and the resources on which the tasks were performed.

In step 404, the individual identities are clustered into the one or more group identities based on the corresponding sets of recommended access control assignments. For instance, recommender 212 clusters the individual identities into groups based on similarities (e.g., cosine similarity, etc.) between the sets of recommended access control assignments of the individual identities. In embodiments, recommender 212 performs clustering based on a hierarchical clustering algorithm that builds a hierarchy of clusters using a top-down approach based on a similarity (e.g., cosine similarity, etc.) between the sets of recommended access control assignments of the individual identities.

In step 406, sets of recommended access control assignments are determined by assigning overlapping candidate access control assignments in the sets of recommended access control assignments of individual identities in a cluster to a group identity that includes the individual identities of the cluster as members of the group identity. For instance, recommender 212 clusters individual identities with similar recommended access control assignments into a group identity, where overlapping recommended access control assignments are assigned to the group identity instead of the individual identities and non-overlapping recommended access control assignments are assigned to the individual identities. In instances, recommender 212 forms sub-groups by clustering group identities into larger groups, where overlapping recommended access control assignments are assigned to a larger (i.e., parent) group identity and non-overlapping recommended access control assignments are assigned to the smaller (i.e., child) group identity.

Figure 5:
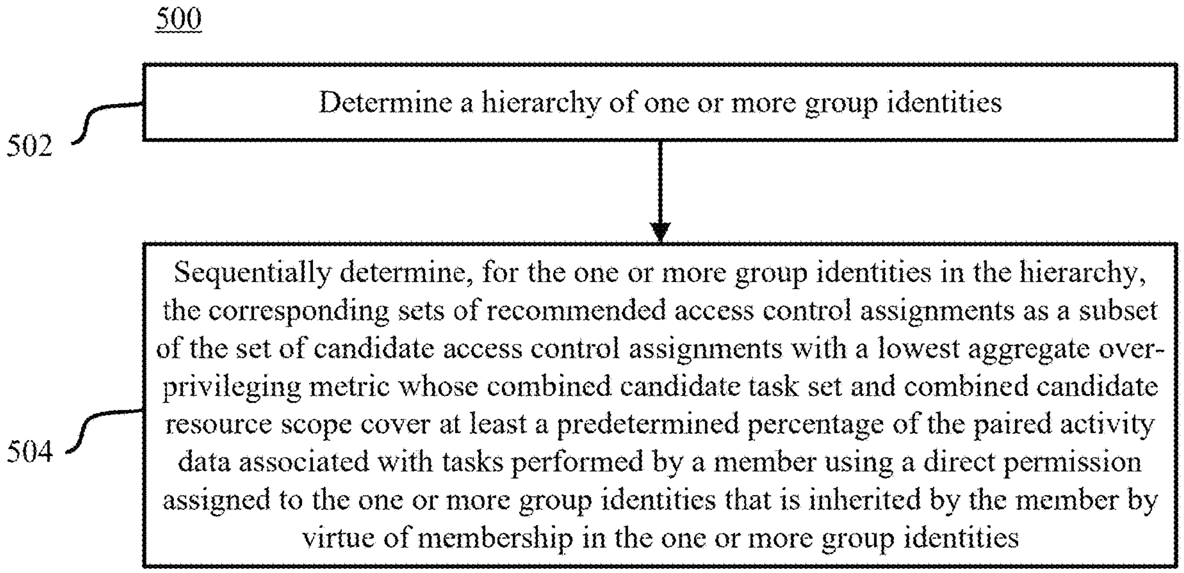
FIG. 5 depicts a flowchart of an example process for determining reduced privilege access control assignment recommendations for existing group identities, in accordance with an embodiment.

Embodiments described herein may operate in various ways to determine group memberships to reduce over-privileging. For instance, FIG. 5 depicts a flowchart 500 of a process for determining group memberships to reduce over-privileging, in accordance with an embodiment. Server infrastructure 102, permission analyzer 104, candidate access control assignments 106, historical activity data 108, current access control assignments 110, penalty data 112, group membership data 114, historical representation generator 202, candidate assignment representation generator 204, metric analyzer 206, candidate access control assignment selector 208, candidate group membership selector 210, and/or recommender 212 may operate according to flowchart 500, for example. Flowchart 500 is described as follows with respect to FIGS. 1 and 2 for illustrative purposes.

Flowchart 500 starts at step 502. In step 502, a hierarchy of one or more group identities is determined. For instance, candidate access control assignment selector 208 determines a hierarchy structure of identities 116. The hierarchical structure (e.g., tree) structure includes, as root nodes, identities (e.g., individual identities, group identities, etc.) that are not a member of any other group. Each subsequent level of the hierarchical structure includes identities (e.g., individual identities, group identities, etc.) that are members of a node in the preceding level of the hierarchy. The hierarchical structure includes, as leaf nodes, identities (e.g., individual identities, group identities, etc.) that have no members.

In step 504, corresponding sets of recommended access control assignments are sequentially determined for the one or more group identities in the hierarchy as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities. For instance, candidate access control assignment selector 208 determines sets of recommended access control assignments 224 for the set of identities 116 by sequentially determining a set of recommended access control assignments for the set of identities 116 by traversing the hierarchical structure using a top-down approach.

Figure 6:
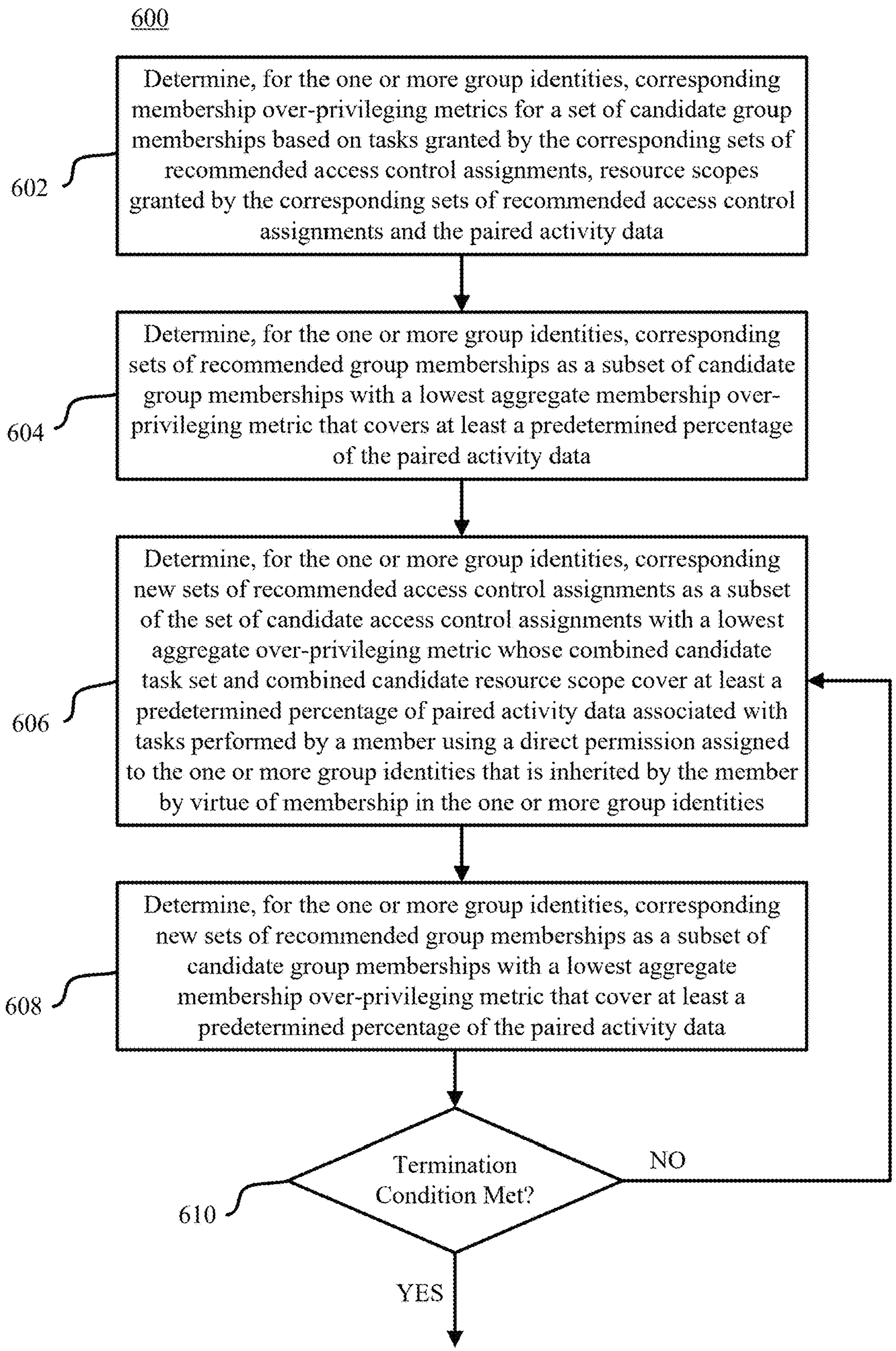
FIG. 6 depicts a flowchart of an example process for iteratively determining reduced privilege access control assignment recommendations for group identities, in accordance with an embodiment.

Embodiments described herein may operate in various ways to iteratively determine reduced privilege access control assignment recommendations for group identities. For instance, FIG. 6 depicts a flowchart 600 of a process for iteratively determining reduced privilege access control assignment recommendations for group identities, in accordance with an embodiment. Server infrastructure 102, permission analyzer 104, candidate access control assignments 106, historical activity data 108, current access control assignments 110, penalty data 112, group membership data 114, historical representation generator 202, candidate assignment representation generator 204, metric analyzer 206, candidate access control assignment selector 208, candidate group membership selector 210, and/or recommender 212 may operate according to flowchart 600, for example. Note that not all steps of flowchart 600 may need to be performed in all embodiments, and in some embodiments, the steps of flowchart 600 may be performed in different orders than shown. Flowchart 600 is described as follows with respect to FIGS. 1 and 2 for illustrative purposes.

Flowchart 600 starts at step 602. In step 602, membership over-privileging metrics corresponding to one or more group identities are determined based on tasks granted by the corresponding sets of recommended access control assignments, resource scopes granted by the corresponding sets of recommended access control assignments and the paired activity data. For instance, metric analyzer 206 determines membership over-privileging metrics 226 for candidate group memberships based on the sets of recommended access control assignments 224 provided by candidate access control assignment selector 208.

In step 604, sets of recommended group memberships corresponding to the one or more group identities are determined as a subset of candidate group memberships with a lowest aggregate membership over-privileging metric compared to other subsets of the set of candidate group memberships that covers at least a predetermined percentage of the paired activity data. For instance, candidate group membership selector 210 determines sets of recommended group members for group identities of the set of identities 116 as a subset of candidate group members with a lowest aggregate over-privileging metric that covers at least a predetermined percentage of the paired activity data of the candidate members.

In step 606, new sets of recommended access control assignments corresponding to the one or more group identities are determined as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities. For instance, candidate access control assignment selector 208 receives updated over-privileging metrics in updated candidate access control assignment data 222 from metric analyzer 206 that are determined by metric analyzer 206 based on updated group memberships 228, and iteratively updates the sets of recommended access control assignments 224 based on the updated over-privileging metrics.

In step 608, new sets of recommended group memberships corresponding to the one or more group identities are determined as a subset of candidate group memberships with a lowest aggregate membership over-privileging metric compared to other subsets of the set of candidate group memberships that cover at least a predetermined percentage of the paired activity data. For instance, candidate group membership selector 210 iteratively receives updated membership over-privileging metrics 226 determined based on updated sets of recommended access control assignments 224, and determines updated group memberships 228 for the groups that reduce over-privileging metrics based on the updated access control assignment recommendations. In instances, candidate group membership selector 210 enables the creation of new groups by adding empty "dummy" groups at the start of the process, where the number of new groups are be limited by the number of dummy groups that are added.

In step 610, it is determined whether a termination condition is met. For instance, iterations continue until a termination condition is satisfied, such as, but not limited to, after a predetermined number of iterations, after a predetermined period of time, and/or until there are no changes in the updated sets of access control assignment recommendations and/or updated group memberships. If a termination is met, flowchart 600 ends, otherwise, flowchart 600 proceeds back to step 606.

Figure 7:
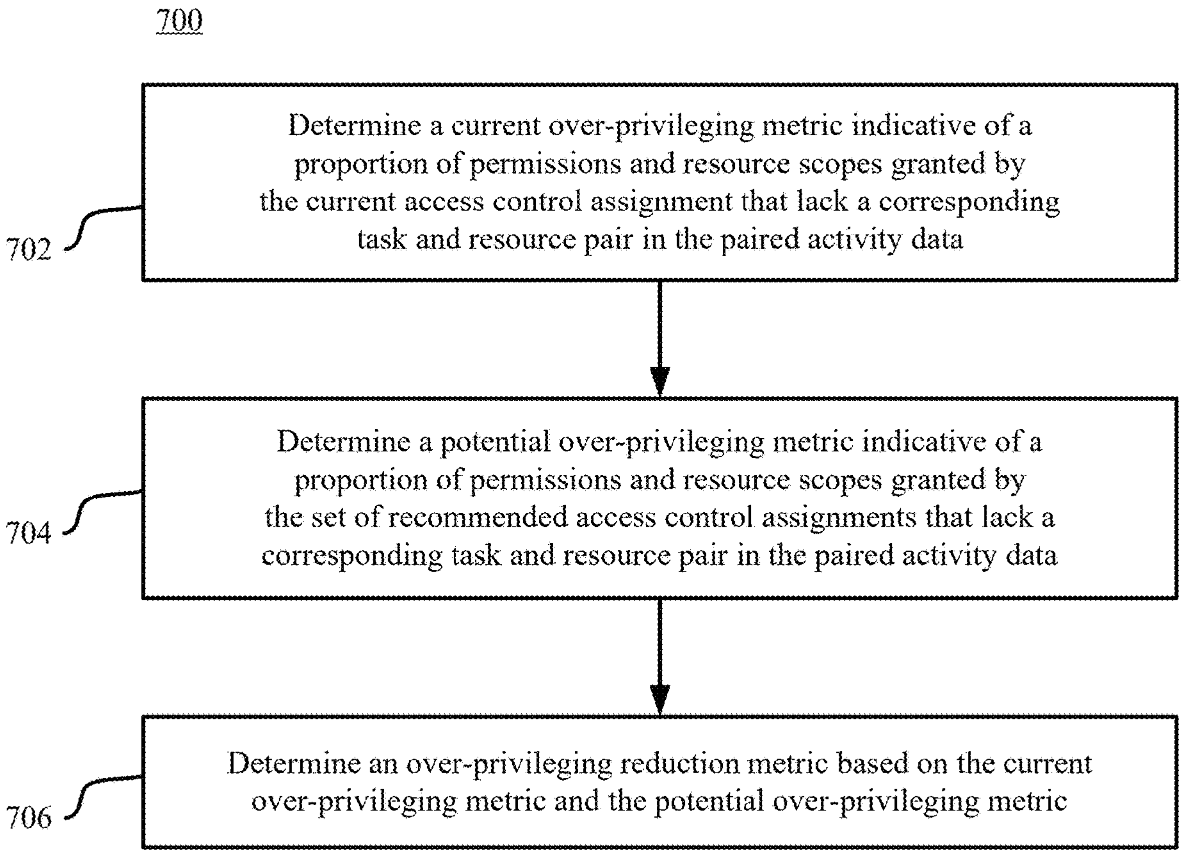
FIG. 7 depicts a flowchart of an example process for determining an over-privileging reduction metric, in accordance with an embodiment.

Embodiments described herein may operate in various ways to determine an over-privileging reduction metric. For instance, FIG. 7 depicts a flowchart 700 of a process for determining an over-privileging reduction metric, in accordance with an embodiment. Server infrastructure 102, permission analyzer 104, candidate access control assignments 106, historical activity data 108, current access control assignments 110, penalty data 112, group membership data 114, historical representation generator 202, candidate assignment representation generator 204, metric analyzer 206, candidate access control assignment selector 208, candidate group membership selector 210, recommender 212, and/or current assignment representation generator 216 may operate according to flowchart 700, for example. Note that not all steps of flowchart 700 may need to be performed in all embodiments, and in some embodiments, the steps of flowchart 700 may be performed in different orders than shown. Flowchart 700 is described as follows with respect to FIGS. 1 and 2 for illustrative purposes.

Flowchart 700 starts at step 702. In step 702, a current over-privileging metric indicative of a proportion of permissions and resource scopes granted by the current access control assignment that lack a corresponding task and resource pair in the paired activity data. For instance, metric reduction analyzer 130 determines, for current assignments 122 currently assigned to the set of identities 116, an aggregate over-privileging metric based on various factors, such as, but not limited to: the tasks permitted by the current access control assignment, the resources and/or resource groups that the tasks may be performed on, whether the current access control assignment is assigned on a permanent basis or an on-demand basis, the occurrence of task and resource pairs in a historical representation, a frequency of occurrence of task and resource pairs in a historical representation, and/or a pattern of occurrence of task and resource pairs in a historical representation.

In step 704, a potential over-privileging metric indicative of a proportion of permissions and resource scopes granted by the set of recommended access control assignments that lack a corresponding task and resource pair in the paired activity data is determined. For instance, metric reduction analyzer 130 determines, for recommended access control assignments 224, an aggregate over-privileging metric based on various factors, such as, but not limited to: the tasks permitted by the recommended access control assignments, the resources and/or resource groups that the tasks may be performed on, whether the recommended access control assignment will be assigned on a permanent basis or an on-demand basis, the occurrence of task and resource pairs in a historical representation, a frequency of occurrence of task and resource pairs in a historical representation, and/or a pattern of occurrence of task and resource pairs in a historical representation.

In step 706, an over-privileging reduction metric is determined based on the current over-privileging metric and the potential over-privileging metric. For instance, metric reduction analyzer 130 determines an over-privileging reduction metric as a percentage based on $$\frac{\left(\sum_{current} - \sum_{recommended}\right)}{\sum_{current}},$$

where $\Sigma_{current}$ represents an aggregate over-privileging metric associated with current access control assignments currently assigned to an identity, and $\Sigma_{recommended}$ represents an aggregate over-privileging metric associated with the set of recommended access control assignments. In embodiments, $\Sigma_{current}$ is determined by comparing the current permissions matrix to the historical matrix to determine task and resource pairs that are permitted by the current access control assignments with a value of zero in the historical matrix, and $\Sigma_{recommended}$ is determined by comparing the full-axes candidate permissions matrices associated with the set of recommended access control assignments to the historical matrix to determine task and resource pairs that would be permitted by the set of recommended access control assignments with a value of zero in the historical matrix. In instances, metric reduction analyzer 130 provides the over-privileging reduction metric for displaying to a customer as a percentage.

III. Example Mobile Device and Computer System Implementation

Server infrastructure 102, permission analyzer 104, candidate access control assignments 106, historical activity data 108, current access control assignments 110, penalty data 112, group membership data 114, metric reduction analyzer 130, historical representation generator 202, candidate assignment representation generator 204, metric analyzer 206, candidate access control assignment selector 208, candidate group membership selector 210, recommender 212, rollback data 214, current assignment representation generator 216, and/or components described therein are implemented in hardware, or hardware combined with one or both of software and/or firmware. For example, server infrastructure 102, permission analyzer 104, candidate access control assignments 106, historical activity data 108, current access control assignments 110, penalty data 112, group membership data 114, metric reduction analyzer 130, historical representation generator 202, candidate assignment representation generator 204, metric analyzer 206, candidate access control assignment selector 208, candidate group membership selector 210, recommender 212, rollback data 214, current assignment representation generator 216, and/or the components described therein, and/or the steps of flowcharts 300, 400, 500, 600, and/or 700 are each implemented as computer program code/instructions configured to be executed in one or more processors and stored in a computer readable storage medium. Alternatively, server infrastructure 102, permission analyzer 104, candidate access control assignments 106, historical activity data 108, current access control assignments 110, penalty data 112, group membership data 114, metric reduction analyzer 130, historical representation generator 202, candidate assignment representation generator 204, metric analyzer 206, candidate access control assignment selector 208, candidate group membership selector 210, recommender 212, rollback data 214, current assignment representation generator 216, and/or the components described therein, and/or the steps of flowcharts 300, 400, 500, 600, and/or 700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 8:
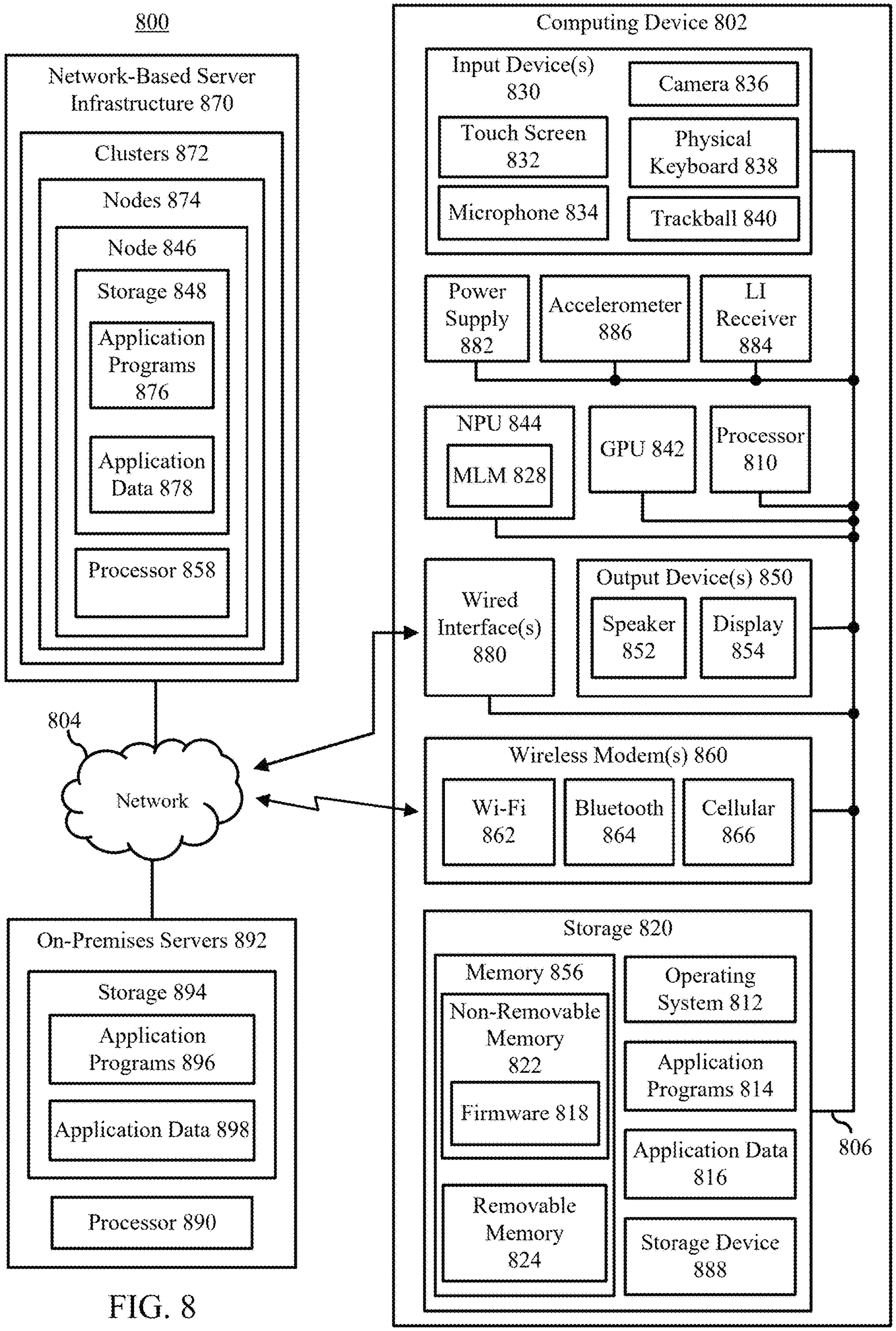
FIG. 8 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 8. FIG. 8 shows a block diagram of an exemplary computing environment 800 that includes a computing device 802. Computing device 802 is an example of server infrastructure 102, which each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WAN s), enterprise networks, the Internet, etc. In examples, network 804 includes one or more wired and/or wireless portions. In some examples, network 804 additionally or alternatively includes a cellular network for cellular communications. Computing device 802 is described in detail as follows.

Computing device 802 can be any of a variety of types of computing devices. Examples of computing device 802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 802 is a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, a graphics processing unit (GPU) 842, a neural processing unit (NPU) 844, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 888. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and in a particular embodiment any combination of the components are present. In examples, components of computing device 802 are mounted to a circuit card (e.g., a motherboard) of computing device 802, integrated in a housing of computing device 802, or otherwise included in computing device 802. The components of computing device 802 are described as follows.

In embodiments, a single processor 810 (e.g., central processing unit (CPU), microcontroller, a microprocessor, signal processor, ASIC (application specific integrated circuit), and/or other physical hardware processor circuit) or multiple processors 810 are present in computing device 802 for performing such tasks as program execution, signal coding, data processing, input/output processing, power control, and/or other functions. In examples, processor 810 is a single-core or multi-core processor, and each processor core is single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). In examples, application programs 814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 810 includes one or more general processors (e.g., CPUs) configured with or coupled to one or more hardware accelerators, such as one or more NPU s 844 and/or one or more GPU s 842.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) present to communicatively couple processor 810 to various other components of computing device 802, although in other embodiments, an alternative bus, further buses, and/or one or more individual signal lines is/are present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 888, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 822 includes main memory and is separate from or fabricated in a same integrated circuit as processor 810. As shown in FIG. 8, non-removable memory 822 stores firmware 818 that is present to provide low-level control of hardware. Examples of firmware 818 include BIO S (Basic Input/Output System, such as on personal computers) and boot firmware (e.g., on smart phones). In examples, removable memory 824 is inserted into a receptacle of or is otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 888 are present that are internal and/or external to a housing of computing device 802 and are or are not removable. Examples of storage device 888 include a hard disk drive, an SSD, a thumb drive (e.g., a USB (Universal Serial Bus) flash drive), or other physical storage device.

One or more programs are stored in storage 820. Such programs include operating system 812, one or more application programs 814, and other program modules and program data. Examples of such application programs include computer program logic (e.g., computer program code/instructions) for implementing permission analyzer 104, candidate access control assignments 106, historical activity data 108, current access control assignments 110, penalty data 112, group membership data 114, metric reduction analyzer 130, historical representation generator 202, candidate assignment representation generator 204, metric analyzer 206, candidate access control assignment selector 208, candidate group membership selector 210, recommender 212, rollback data 214, current assignment representation generator 216, and/or each of the components described therein, as well as any of flowcharts 300, 400, 500, 600, 700, and/or any individual steps thereof.

Storage 820 also stores data used and/or generated by operating system 812 and application programs 814 as application data 816. Examples of application data 816 include web pages, text, images, tables, sound files, video data, and other data. In examples, application data 816 is sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 802 through one or more input devices 830 and receives information from computing device 802 through one or more output devices 850. Input device(s) 830 includes one or more of touch screen 832, microphone 834, camera 836, physical keyboard 838 and/or trackball 840 and output device(s) 850 includes one or more of speaker 852 and display 854. Each of input device(s) 830 and output device(s) 850 are integral to computing device 802 (e.g., built into a housing of computing device 802) or are external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 displays information, as well as operating as touch screen 832 by receiving user commands and/or other information (e.g., by touch, finger gestures, virtual keyboard, etc.) as a user interface. Any number of each type of input device(s) 830 and output device(s) 850 are present, including multiple microphones 834, multiple cameras 836, multiple speakers 852, and/or multiple displays 854.

In embodiments where GPU 842 is present, GPU 842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 828. In an example, NPU 844 is configured for a data-driven parallel computing and is highly efficient at processing massive multimedia data such as videos and images and processing data for neural networks. NPU 844 is configured for efficient handling of AI-related tasks, such as speech recognition, background blurring in video calls, photo or video editing processes like object detection, etc.

In embodiments disclosed herein that implement ML models, NPU 844 can be utilized to execute such ML models, of which MLM 828 is an example. For instance, where applicable, MLM 828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLM s), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLM s are transformer-based LLM s (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 844 is used to train MLM 828. To train MLM 828, training data that includes input features (attributes) and their corresponding output labels/target values (e.g., for supervised learning) is collected. A training algorithm is a computational procedure that is used so that MLM 828 learns from the training data. Parameters/weights are internal settings of MLM 828 that are adjusted during training by the training algorithm to reduce a difference between predictions by MLM 828 and actual outcomes (e.g., output labels). In some examples, MLM 828 is set with initial values for the parameters/weights. A loss function measures a dissimilarity between predictions by MLM 828 and the target values, and the parameters/weights of MLM 828 are adjusted to minimize the loss function. The parameters/weights are iteratively adjusted by an optimization technique, such as gradient descent. In this manner, MLM 828 is generated through training by NPU 844 to be used to generate inferences based on received input feature sets for particular applications. MLM 828 is generated as a computer program or other type of algorithm configured to generate an output (e.g., a classification, a prediction/inference) based on received input features, and is stored in the form of a file or other data structure.

In examples, such training of MLM 828 by NPU 844 is supervised or unsupervised. According to supervised learning, input objects (e.g., a vector of predictor variables) and a desired output value (e.g., a human-labeled supervisory signal) train MLM 828. The training data is processed, building a function that maps new data on expected output values. Example algorithms usable by NPU 844 to perform supervised training of MLM 828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 828 is an LLM, MLM 828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 828 is trained to learn patterns from unlabeled data. For instance, in embodiments where MLM 828 implements unsupervised learning techniques, MLM 828 identifies one or more classifications or clusters to which an input belongs. During a training phase of MLM 828 according to unsupervised learning, MLM 828 tries to mimic the provided training data and uses the error in its mimicked output to correct itself (i.e., correct weights and biases). In further examples, NPU 844 perform unsupervised training of MLM 828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 844 need not necessarily be present in all ML model embodiments. In embodiments where ML models are present, any one or more of processor 810, GPU 842, and/or NPU 844 can be present to train and/or execute MLM 828.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). In examples, wireless modem 860 also or alternatively includes other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (FireWire) port, an RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and receives power from a battery internal to computing device 802, and/or from a power cord plugged into a power port of computing device 802 (e.g., a USB port, an A/C power port). LI receiver 884 is useable for location determination of computing device 802 and in examples includes a satellite navigation receiver such as a Global Positioning System (GPS) receiver and/or includes other type of location determiner configured to determine location of computing device 802 based on received information (e.g., using cell tower triangulation, etc.). Accelerometer 886, when present, is configured to determine an orientation of computing device 802.

Note that the illustrated components of computing device 802 are not required or all-inclusive, and fewer or greater numbers of components can be present as would be recognized by one skilled in the art. In examples, computing device 802 includes one or more of a gyroscope, barometer, proximity sensor, ambient light sensor, digital compass, etc. In an example, processor 810 and memory 856 are co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein is stored in storage 820 and executed by processor 810.

In some embodiments, server infrastructure 870 is present in computing environment 800 and is communicatively coupled with computing device 802 via network 804. Server infrastructure 870, when present, is a network-accessible server set (e.g., a cloud-based environment or platform). As shown in FIG. 8, server infrastructure 870 includes clusters 872. Each of clusters 872 comprises a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. In examples, any of nodes 874 is a storage node that comprises a plurality of physical storage disks, SSDs, and/or other physical storage devices that are accessible via network 804 and are configured to store data associated with the applications and services managed by nodes 874.

Each of nodes 874, as a compute node, comprises one or more server computers, server systems, and/or computing devices. For instance, a node 874 in accordance with an embodiment includes one or more of the components of computing device 802 disclosed herein. Each of nodes 874 is configured to execute one or more software applications (or "applications") and/or services and/or manage hardware resources (e.g., processors, memory, etc.), which are utilized by users (e.g., customers) of the network-accessible server set. In examples, as shown in FIG. 8, nodes 874 includes a node 846 that includes storage 848 and/or one or more of a processor 858 (e.g., similar to processor 810, GPU 842, and/or NPU 844 of computing device 802). Storage 848 stores application programs 876 and application data 878. Processor(s) 858 operate application programs 876 which access and/or generate related application data 878. In an implementation, nodes such as node 846 of nodes 874 operate or comprise one or more virtual machines, with each virtual machine emulating a system architecture (e.g., an operating system), in an isolated manner, upon which applications such as application programs 876 are executed.

In embodiments, one or more of clusters 872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 872 are included in a datacenter in a distributed collection of datacenters. In embodiments, exemplary computing environment 800 comprises part of a cloud-based platform.

In an embodiment, computing device 802 accesses application programs 876 for execution in any manner, such as by a client application and/or a browser at computing device 802.

In an example, for purposes of network (e.g., cloud) backup and data security, computing device 802 additionally and/or alternatively synchronizes copies of application programs 814 and/or application data 816 to be stored at network-based server infrastructure 870 as application programs 876 and/or application data 878. In examples, operating system 812 and/or application programs 814 include a file hosting service client configured to synchronize applications and/or data stored in storage 820 at network-based server infrastructure 870.

In some embodiments, on-premises servers 892 are present in computing environment 800 and are communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 can be shared by on-premises servers 892 between computing devices of the organization, including computing device 802 (when part of an organization) through a local network of the organization, and/or through further networks accessible to the organization (including the Internet). Furthermore, in examples, on-premises servers 892 serve applications such as application programs 896 to the computing devices of the organization, including computing device 802. Accordingly, in examples, on-premises servers 892 include storage 894 (which includes one or more physical storage devices such as storage disks and/or SSDs) for storage of application programs 896 and application data 898 and include a processor 890 (e.g., similar to processor 810, GPU 842, and/or NPU 844 of computing device 802) for execution of application programs 896. In some embodiments, multiple processors 890 are present for execution of application programs 896 and/or for other purposes. In further examples, computing device 802 is configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 is used to implement systems, clients, or devices, or components/subcomponents thereof, disclosed elsewhere herein. In other embodiments, a combination of computing device 802, network-based server infrastructure 870, and/or on-premises servers 892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) are stored in storage 820. Such computer programs can also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

In an embodiment, a system comprises: a processor; and a memory comprising program code executable to cause the processor to: determine current access control assignments assigned to one or more group identities, the current access control assignments comprising current tasks granted by the current access control assignments and current resource scopes indicative of resources on which performance of the current tasks is currently permitted; determine paired activity data from historical activity data, the paired activity data comprising task and resource pairs indicating tasks performed by an individual identity and corresponding resources on which the tasks were performed; determine, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data; determine, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; and perform a responsive action based at least on the sets of recommended access control assignments.

In an embodiment, to determine the sets of recommended access control assignments, the program code is executed to cause the processor to: approximately solve a first weighted covering problem comprising a tuning parameter that controls a number of the one or more group identities.

In an embodiment, to approximately solve the first weighted covering problem, the program code is executed to cause the processor to: determine, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; cluster the individual identities into the one or more group identities based on the corresponding sets of recommended access control assignments; and determine the sets of recommended access control assignments by assigning overlapping candidate access control assignments in the sets of recommended access control assignments of individual identities in a cluster to a group identity that includes the individual identities of the cluster as members of the group identity.

In an embodiment, to determine the sets of recommended access control assignments, the program code is executed to cause the processor to: approximately solve a second weighted covering problem comprising a group membership constraint that keeps current group memberships for the one or more group identities static.

In an embodiment, to approximately solve the second weighted covering problem, the program code is executed to cause the processor to: determine a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

In an embodiment, to determine the sets of recommended access control assignments, the program code is executed to cause the processor to: approximately solve a third weighted covering problem comprising a group membership variable representing group memberships for the one or more group identities.

In an embodiment, to approximately solve the second weighted covering problem, the program code is executed to cause the processor to: determine, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data; determine, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimize over-privileging metrics for the one or more group identities by iteratively: determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

In an embodiment, to perform the responsive action, the program code is executed to cause the processor to perform at least one of: provide, to a user, a recommendation to keep a current access control assignments currently assigned to the one or more group identities; provide, to a user, a recommendation to remove a current access control assignment currently assigned to the one or more group identities; provide, to a user, a recommendation to replace at least a portion of current access control assignments currently assigned to the one or more group identities with at least a portion of the corresponding sets of recommended access control assignments; provide, to a user, a recommendation to reassign a member of the one or more group identities to another group of the one or more group identities; provide, to a user, a recommendation to merge two or more group identities of the one or more group identities; provide, to a user, a recommendation to split a group of the one or more group identities into two or more group identities; provide, to a user, a recommendation to remove a member of the one or more group identities from the one or more group identities; provide, to a user, a recommendation to create a new group identity and members to move to the new group identity; automatically replace at least a portion of the current access control assignments currently assigned to the one or more group identities with at least a portion of the corresponding sets of recommended group access group control assignments; automatically remove a current access control assignment currently assigned to the one or more group identities; automatically reassign a member of the one or more group identities to another group identity of the one or more group identities; automatically merge two or more group identities of the one or more group identities; automatically split a group of the one or more group identities into two or more group identities; automatically remove a member of the one or more group identities from the one or more group identities; or automatically create a new group identity and assign a set of recommended access controls to the new group identity.

In an embodiment, to determine, for the one or more group identities, corresponding sets of recommended access control assignments, the program code is executed to cause the processor to perform at least one of: determine, for the one or more group identities, corresponding sets of recommended access control assignments subject to a predetermined number of access control assignments that may be assigned per group identity; determine, for the one or more group identities, corresponding sets of recommended access control assignments subject to maintaining a membership of one or more group identities static; determine, for the one or more group identities, corresponding sets of recommended access control assignments subject to a penalty to promote group permission sparsity; or determine, for the set of candidate access control assignments, at least one of: excepting the candidate access control assignment from recommendation for the one or more group identities, recommending the candidate access control assignment to the one or more group identities on an on-demand basis, or recommending the candidate access control assignment to the one or more group identities on a permanent basis.

In an embodiment, the one or more group identities comprise at least one of: a group identity comprising one or more members; a sub-group identity of a parent group identity, wherein the sub-group identity inherits access control assignments assigned to the parent group identity and to group identities that encompass the parent group identity; an empty group identity with no members; or a pseudo group identity that represents an individual identity, wherein the pseudo group identity comprises the individual identity as its sole member and is assigned the access control assignments assigned to the individual identity.

In an embodiment, a method comprises: determining paired activity data from historical activity data, the paired activity data comprising task and resource pairs indicating tasks performed by an individual identity and corresponding resources on which the tasks were performed; determining, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data; determining, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; and performing a responsive action based at least on the sets of recommended access control assignments.

In an embodiment, determining the sets of recommended access control assignments comprises: determining, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; clustering the individual identities into the one or more group identities based on the corresponding sets of recommended access control assignments; and determining the sets of recommended access control assignments by assigning overlapping candidate access control assignments in the sets of recommended access control assignments of individual identities in a cluster to a group identity that includes the individual identities of the cluster as members of the group identity.

In an embodiment, determining the sets of recommended access control assignments comprises: determining a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

In an embodiment, determining the sets of recommended access control assignments comprises: determining, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data; determining, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimizing over-privileging metrics for the one or more group identities by iteratively: determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

In an embodiment, performing the responsive action comprises at least one of: providing, to a user, a recommendation to keep a current access control assignments currently assigned to the one or more group identities; providing, to a user, a recommendation to remove a current access control assignment currently assigned to the one or more group identities; providing, to a user, a recommendation to replace at least a portion of current access control assignments currently assigned to the one or more group identities with at least a portion of the corresponding sets of recommended access control assignments; providing, to a user, a recommendation to reassign a member of the one or more group identities to another group of the one or more group identities; providing, to a user, a recommendation to merge two or more group identities of the one or more group identities; providing, to a user, a recommendation to split a group of the one or more group identities into two or more group identities; providing, to a user, a recommendation to remove a member of the one or more group identities from the one or more group identities; providing, to a user, a recommendation to create a new group identity and members to move to the new group identity; automatically replacing at least a portion of the current access control assignments currently assigned to the one or more group identities with at least a portion of the corresponding sets of recommended access group control assignments; automatically removing a current access control assignment currently assigned to the one or more group identities; automatically reassigning a member of the one or more group identities to another group identity of the one or more group identities; automatically merging two or more group identities of the one or more group identities; automatically splitting a group of the one or more group identities into two or more group identities; automatically removing a member of the one or more group identities from the one or more group identities; or automatically creating a new group identity and assign a set of recommended access controls to the new group identity.

In an embodiment, a computer-readable storage medium comprises instructions that are executed by a processor to cause the processor to: determine current access control assignments assigned to one or more group identities, the current access control assignments comprising current tasks granted by the current access control assignments and current resource scopes indicative of resources on which performance of the current tasks is currently permitted; determine paired activity data from historical activity data, the paired activity data comprising task and resource pairs indicating tasks performed by an individual identity and corresponding resources on which the tasks were performed; determine, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data; determine, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; determine, for the sets of recommended access control assignments, whether to assign a recommended access control assignment of the sets of recommended access control assignments to the one or more group identities on a permanent basis or an on-demand basis; and perform a responsive action based at least on the sets of recommended access control assignments.

In an embodiment, to determine the sets of recommended access control assignments, the instructions are executed to cause the processor to: determine, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; cluster the individual identities into the one or more group identities based on the corresponding sets of recommended access control assignments; and determine the sets of recommended access control assignments by assigning overlapping candidate access control assignments in the sets of recommended access control assignments of individual identities in a cluster to a group identity that includes the individual identities of the cluster as members of the group identity.

In an embodiment, to determine the sets of recommended access control assignments, the instructions are executed to cause the processor to: determine a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

In an embodiment, to determine the sets of recommended access control assignments, the instructions are executed to cause the processor to: determine, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data; determine, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimize over-privileging metrics for the one or more group identities by iteratively: determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

In an embodiment, to perform the responsive action, the instructions are executed to cause the processor to perform at least one of: provide, to a user, a recommendation to keep a current access control assignments currently assigned to the one or more group identities; provide, to a user, a recommendation to remove a current access control assignment currently assigned to the one or more group identities; provide, to a user, a recommendation to replace at least a portion of current access control assignments currently assigned to the one or more group identities with at least a portion of the corresponding sets of recommended access control assignments; provide, to a user, a recommendation to reassign a member of the one or more group identities to another group of the one or more group identities; provide, to a user, a recommendation to merge two or more group identities of the one or more group identities; provide, to a user, a recommendation to split a group of the one or more group identities into two or more group identities; provide, to a user, a recommendation to remove a member of the one or more group identities from the one or more group identities; provide, to a user, a recommendation to create a new group identity and members to move to the new group identity; automatically replace at least a portion of the current access control assignments currently assigned to the one or more group identities with at least a portion of the corresponding sets of recommended access group control assignments; automatically remove a current access control assignment currently assigned to the one or more group identities; automatically reassign a member of the one or more group identities to another group identity of the one or more group identities; automatically merge two or more group identities of the one or more group identities; automatically split a group of the one or more group identities into two or more group identities; automatically remove a member of the one or more group identities from the one or more group identities; or automatically create a new group identity and assign a set of recommended access controls to the new group identity.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system comprising:

a processor; and a memory comprising program code executable to cause the processor to:

determine current access control assignments assigned to one or more group identities, the current access control assignments comprising current tasks granted by the current access control assignments and current resource scopes indicative of resources on which performance of the current tasks is currently permitted;

determine paired activity data from historical activity data, the paired activity data comprising task and resource pairs indicating tasks performed by an individual identity and corresponding resources on which the tasks were performed;

determine, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data;

determine, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; and perform a responsive action based at least on the sets of recommended access control assignments.

2. The system of claim 1, wherein, to determine the sets of recommended access control assignments, the program code is executed to cause the processor to:

approximately solve a first weighted covering problem comprising a tuning parameter that controls a number of the one or more group identities.

3. The system of claim 2, wherein, to approximately solve the first weighted covering problem, the program code is executed to cause the processor to:

determine, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data;

cluster the individual identities into the one or more group identities based on the corresponding sets of recommended access control assignments; and determine the sets of recommended access control assignments by assigning overlapping candidate access control assignments in the sets of recommended access control assignments of individual identities in a cluster to a group identity that includes the individual identities of the cluster as members of the group identity.

4. The system of claim 1, wherein, to determine the sets of recommended access control assignments, the program code is executed to cause the processor to:

approximately solve a second weighted covering problem comprising a group membership constraint that keeps current group memberships for the one or more group identities static.

5. The system of claim 4, wherein, to approximately solve the second weighted covering problem, the program code is executed to cause the processor to:

determine a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

6. The system of claim 1, wherein, to determine the sets of recommended access control assignments, the program code is executed to cause the processor to:

approximately solve a third weighted covering problem comprising a group membership variable representing group memberships for the one or more group identities.

7. The system of claim 6, wherein, to approximately solve the second weighted covering problem, the program code is executed to cause the processor to:

determine, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data;

determine, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimize over-privileging metrics for the one or more group identities by iteratively:

determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

8. The system of claim 1, wherein, to perform the responsive action, the program code is executed to cause the processor to perform at least one of:

provide, to a user, a recommendation to keep a current access control assignments currently assigned to the one or more group identities;

provide, to a user, a recommendation to remove a current access control assignment currently assigned to the one or more group identities;

provide, to a user, a recommendation to replace at least a portion of current access control assignments currently assigned to the one or more group identities with at least a portion of the corresponding sets of recommended access control assignments;

provide, to a user, a recommendation to reassign a member of the one or more group identities to another group of the one or more group identities;

provide, to a user, a recommendation to merge two or more group identities of the one or more group identities;

provide, to a user, a recommendation to split a group of the one or more group identities into two or more group identities;

provide, to a user, a recommendation to remove a member of the one or more group identities from the one or more group identities;

provide, to a user, a recommendation to create a new group identity and members to move to the new group identity;

automatically replace at least a portion of the current access control assignments currently assigned to the one or more group identities with at least a portion of the corresponding sets of recommended group access group control assignments;

automatically remove a current access control assignment currently assigned to the one or more group identities;

automatically reassign a member of the one or more group identities to another group identity of the one or more group identities;

automatically merge two or more group identities of the one or more group identities;

automatically split a group of the one or more group identities into two or more group identities;

automatically remove a member of the one or more group identities from the one or more group identities; or automatically create a new group identity and assign a set of recommended access controls to the new group identity.

9. The system of claim 1, wherein, to determine, for the one or more group identities, corresponding sets of recommended access control assignments, the program code is executed to cause the processor to perform at least one of:

determine, for the one or more group identities, corresponding sets of recommended access control assignments subject to a predetermined number of access control assignments that may be assigned per group identity;

determine, for the one or more group identities, corresponding sets of recommended access control assignments subject to maintaining a membership of one or more group identities static;

determine, for the one or more group identities, corresponding sets of recommended access control assignments subject to a penalty to promote group permission sparsity; or determine, for the set of candidate access control assignments, at least one of:

excepting the candidate access control assignment from recommendation for the one or more group identities, recommending the candidate access control assignment to the one or more group identities on an on-demand basis, or recommending the candidate access control assignment to the one or more group identities on a permanent basis.

10. The system of claim 1, wherein the one or more group identities comprise at least one of:

a group identity comprising one or more members;

a sub-group identity of a parent group identity, wherein the sub-group identity inherits access control assignments assigned to the parent group identity and to group identities that encompass the parent group identity;

an empty group identity with no members; or a pseudo group identity that represents an individual identity, wherein the pseudo group identity comprises the individual identity as its sole member and is assigned the access control assignments assigned to the individual identity.

11. A method comprising:

determining paired activity data from historical activity data, the paired activity data comprising task and resource pairs indicating tasks performed by an individual identity and corresponding resources on which the tasks were performed;

determining, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data;

determining, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data; and performing a responsive action based at least on the sets of recommended access control assignments.

12. The method of claim 11, wherein determining the sets of recommended access control assignments comprises:

determining, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data;

clustering the individual identities into the one or more group identities based on the corresponding sets of recommended access control assignments; and determining the sets of recommended access control assignments by assigning overlapping candidate access control assignments in the sets of recommended access control assignments of individual identities in a cluster to a group identity that includes the individual identities of the cluster as members of the group identity.

13. The method of claim 11, wherein determining the sets of recommended access control assignments comprises:

determining a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

14. The method of claim 11, wherein determining the sets of recommended access control assignments comprises:

determining, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data;

determining, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimizing over-privileging metrics for the one or more group identities by iteratively:

determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

15. The method of claim 11, wherein said performing the responsive action comprises at least one of:

providing, to a user, a recommendation to keep a current access control assignments currently assigned to the one or more group identities;

providing, to a user, a recommendation to remove a current access control assignment currently assigned to the one or more group identities;

providing, to a user, a recommendation to replace at least a portion of current access control assignments currently assigned to the one or more group identities with at least a portion of the corresponding sets of recommended access control assignments;

providing, to a user, a recommendation to reassign a member of the one or more group identities to another group of the one or more group identities;

providing, to a user, a recommendation to merge two or more group identities of the one or more group identities;

providing, to a user, a recommendation to split a group of the one or more group identities into two or more group identities;

providing, to a user, a recommendation to remove a member of the one or more group identities from the one or more group identities;

providing, to a user, a recommendation to create a new group identity and members to move to the new group identity;

automatically replacing at least a portion of the current access control assignments currently assigned to the one or more group identities with at least a portion of the corresponding sets of recommended access group control assignments;

automatically removing a current access control assignment currently assigned to the one or more group identities;

automatically reassigning a member of the one or more group identities to another group identity of the one or more group identities;

automatically merging two or more group identities of the one or more group identities;

automatically splitting a group of the one or more group identities into two or more group identities;

automatically removing a member of the one or more group identities from the one or more group identities; or automatically creating a new group identity and assign a set of recommended access controls to the new group identity.

16. A computer-readable storage medium comprising instructions that are executed by a processor to cause the processor to:

determine current access control assignments assigned to one or more group identities, the current access control assignments comprising current tasks granted by the current access control assignments and current resource scopes indicative of resources on which performance of the current tasks is currently permitted;

determine paired activity data from historical activity data, the paired activity data comprising task and resource pairs indicating tasks performed by an individual identity and corresponding resources on which the tasks were performed;

determine, for a set of candidate access control assignments, corresponding over-privileging metrics based on candidate tasks granted by a corresponding candidate access control assignment of the set of candidate access control assignments, candidate resource scopes granted by the corresponding candidate access control assignment, and the paired activity data;

determine, for the one or more group identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data;

determine, for the sets of recommended access control assignments, whether to assign a recommended access control assignment of the sets of recommended access control assignments to the one or more group identities on a permanent basis or an on-demand basis; and perform a responsive action based at least on the sets of recommended access control assignments.

17. The computer-readable storage medium of claim 16, wherein, to determine the sets of recommended access control assignments, the instructions are executed to cause the processor to:

determine, for the plurality of individual identities, corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data;

cluster the individual identities into the one or more group identities based on the corresponding sets of recommended access control assignments; and determine the sets of recommended access control assignments by assigning overlapping candidate access control assignments in the sets of recommended access control assignments of individual identities in a cluster to a group identity that includes the individual identities of the cluster as members of the group identity.

18. The computer-readable storage medium of claim 16, wherein, to determine the sets of recommended access control assignments, the instructions are executed to cause the processor to:

determine a hierarchy of the one or more group identities; and sequentially determine, for the one or more group identities in the hierarchy, the corresponding sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of the paired activity data associated with tasks performed by a member using a direct permission assigned to the one or more group identities that is inherited by the member by virtue of membership in the one or more group identities.

19. The computer-readable storage medium of claim 16, wherein, to determine the sets of recommended access control assignments, the instructions are executed to cause the processor to:

determine, for the one or more group identities, corresponding membership over-privileging metrics for a set of candidate group memberships based on tasks granted by the corresponding sets of recommended access control assignments, resource scopes granted by the corresponding sets of recommended access control assignments and the paired activity data;

determine, for the one or more group identities, corresponding sets of recommended group memberships as a subset of candidate group memberships with a lowest aggregate membership over-privileging metric compared to other subsets of the set of candidate group memberships that covers at least a predetermined percentage of the paired activity data; and minimize over-privileging metrics for the one or more group identities by iteratively:

determining, for the one or more group identities, corresponding new sets of recommended access control assignments as a subset of the set of candidate access control assignments with a lowest aggregate over-privileging metric compared to other subsets of the set of candidate access control assignments whose combined candidate task set and combined candidate resource scope cover at least a predetermined percentage of paired activity data associated with tasks performed by a member using a direct permission assigned to the one or more group identities that is inherited by the member by virtue of membership in the one or more group identities, and determining, for the one or more group identities, corresponding new sets of recommended group memberships as a subset of candidate group memberships with a lowest aggregate membership over-privileging metric compared to other subsets of the set of candidate group memberships that cover at least a predetermined percentage of the paired activity data.

20. The computer-readable storage medium of claim 16, wherein, to perform the responsive action, the instructions are executed to cause the processor to perform at least one of:

provide, to a user, a recommendation to keep a current access control assignments currently assigned to the one or more group identities;

provide, to a user, a recommendation to remove a current access control assignment currently assigned to the one or more group identities;

provide, to a user, a recommendation to replace at least a portion of current access control assignments currently assigned to the one or more group identities with at least a portion of the corresponding sets of recommended access control assignments;

provide, to a user, a recommendation to reassign a member of the one or more group identities to another group of the one or more group identities;

provide, to a user, a recommendation to merge two or more group identities of the one or more group identities;

provide, to a user, a recommendation to split a group of the one or more group identities into two or more group identities;

provide, to a user, a recommendation to remove a member of the one or more group identities from the one or more group identities;

provide, to a user, a recommendation to create a new group identity and members to move to the new group identity;

automatically replace at least a portion of the current access control assignments currently assigned to the one or more group identities with at least a portion of the corresponding sets of recommended access group control assignments;

automatically remove a current access control assignment currently assigned to the one or more group identities;

automatically reassign a member of the one or more group identities to another group identity of the one or more group identities;

automatically merge two or more group identities of the one or more group identities;

automatically split a group of the one or more group identities into two or more group identities;

automatically remove a member of the one or more group identities from the one or more group identities; or automatically create a new group identity and assign a set of recommended access controls to the new group identity.

* * * * *